United States Patent [19]

Yuasa et al.

[11] Patent Number: 4,655,576
[45] Date of Patent: Apr. 7, 1987

[54] LIGHT MEASURING DEVICE

[75] Inventors: Yoshio Yuasa, Osaka; Kazuhiko Naruse, Nabari; Masahito Inaba, Ikeda, all of Japan

[73] Assignee: Minolta Camera Kabushiki Kaisha, Osaka, Japan

[21] Appl. No.: 697,711

[22] Filed: Feb. 1, 1985

[30] Foreign Application Priority Data

Feb. 2, 1984 [JP] Japan .................................. 59-17897

[51] Int. Cl.[4] ............................................. G03B 15/05
[52] U.S. Cl. ................................... 354/415; 354/472; 354/474
[58] Field of Search ............... 354/413, 414, 415, 471, 354/472, 474, 127.1

[56] References Cited

U.S. PATENT DOCUMENTS 4,176,955 12/1979 Yamada et al. .
4,291,979 9/1981 Yuasa et al. .
4,309,090 1/1982 Yamada .
4,373,793 2/1983 Taniguchi et al. .................. 354/415
4,396,263 8/1983 Yamada .
4,401,386 8/1983 Yuasa et al. .
4,529,289 7/1985 Tsumefuji et al. .................. 354/472

FOREIGN PATENT DOCUMENTS 55-12754 10/1980 Japan .
57-38423 3/1982 Japan .

OTHER PUBLICATIONS

Bulletin published by Gossen GmbH.

Primary Examiner—Russell E. Adams
Attorney, Agent, or Firm—Price, Gess & Ubell

[57] ABSTRACT

A light measuring device for use in flash photography, which measures preliminary flash light and ambient light to obtain camera exposure information under a mixture of primary flash light and ambient light, there are provided light measuring means and means for displaying the result of the measurement in such a manner that the desired exposure information of the several positions of the photographic object can be displayed on a common scale so that the effect of the flash light, ambient light and the total light can be recognized in one glance.

35 Claims, 33 Drawing Figures

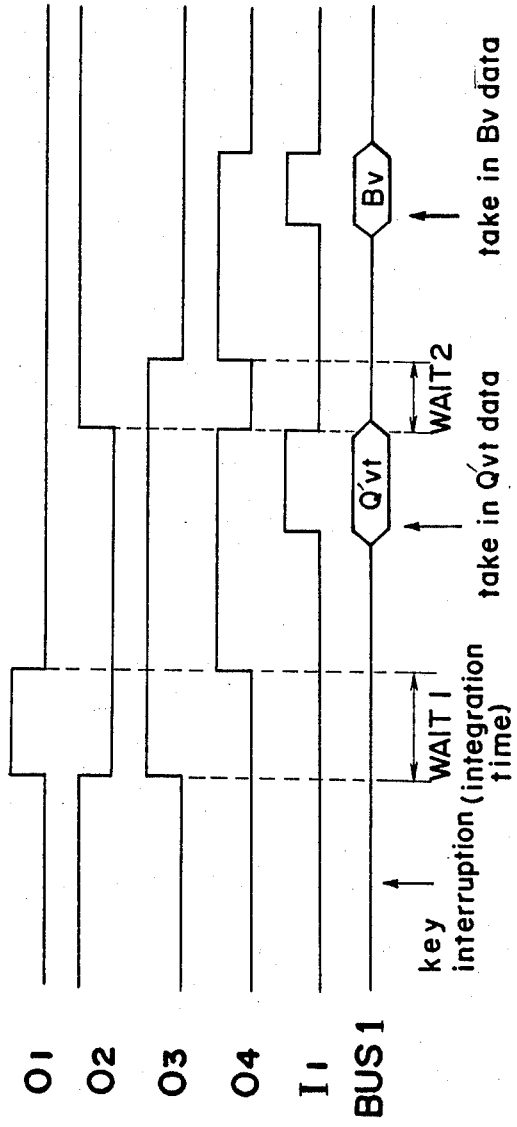

LIGHT MEASURING DEVICE

FIELD OF THE INVENTION

The present invention relates to a light measuring device for use in a flash light photography, and more particularly to a device comprising a display unit for displaying desired exposure information with respect to a plurality of areas of a photographic object.

BACKGROUND OF THE INVENTION

A light measuring device of the above kind is employed to preliminarily obtain information on the amount of light contributing to photographing with respect to each portion of a scene or photography object when an auxiliary light such as flash light is used.

U.S. Pat. No. 4,373,793 discloses one example of a light measuring device for this purpose. In the device of the patent, flash light information and ambient light information are measured with respect to several areas of the photographic object and exposure information with respect to the areas are calculated on the basis of the light information to comparably display them.

SUMMARY OF THE INVENTION

Accordingly an essential object of the present invention is to provide a light measuring device which is an improvement of the above mentioned prior art with respect to the manner of displaying the exposure information for the plurality of portions of an object.

Another object of the present invention is to provide a light measuring device which is capable of displaying the desired exposure information on a common scale for facilitating the recognition of the contrast information at one glance.

A further object of the present invention is to provide a light measuring device which is capable of displaying the desired exposure value under flash light photography with respect to any one of the portions of the photographic object in terms of the auxiliary light, ambient light and total light which is the mixture of the auxiliary light and the ambient light on a common scale.

A still further object of the present invention is to provide a light measuring device which is capable of obtaining the desired exposure information prevent an occurrence if an error in the light measurement even for a high shutter speed.

According to one aspect of the present invention, there is provided a light measuring device for use in flash photography, which measures preliminary flash light and ambient light to obtain camera exposure information under a mixture of primary flash light and ambient light, comprising:

means for measuring light to produce a first output with the influence of the preliminary flash light and a second output without the influence of the preliminary flash light with respect to a plurality of selected areas of the object field, respectively;

first group of means for storing the first output with respect to the plurality of areas, respectively;

second group of means for storing the second output with respect to the plurality of areas, respectively;

means for manually setting the exposure time;

means for calculating exposure information with respect to the plurality of areas in response to the storage of the first and second outputs for the corresponding areas in the first and second groups of the storing means and the exposure time set by the setting means, respectively; and means, responsive to the calculating means, for indicating the exposure information, including means for displaying the exposure information as locations on a visible scale, whereby the differences between the exposure information for the plurality of areas are perceptible as the distances between the locations on the scale at a glance with their order of alignment along the scale.

BRIEF EXPLANATION OF THE DRAWINGS

FIG. 13 is a schematic diagram showing wave forms of the essential portion of the circuit arrangement shown in FIG. 13, FIGS. 14(a) through 14(h) are flow charts showing operation of the first embodiment of the light measuring device according to the present invention.

DESCRIPTION OF THE PREFERRED EMBODIMENTS

Figures 2A, 2B, 2C:
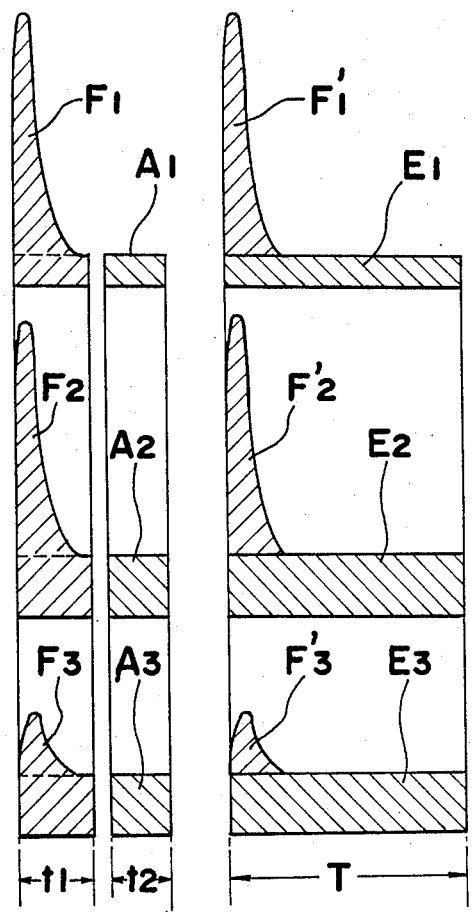
FIGS. 2(a) through 2(c) and 5(a) through 5(c) are graphs showing light values of a photographic object taking the horizontal axis for time and the vertical axis for light value.
Figure 3:
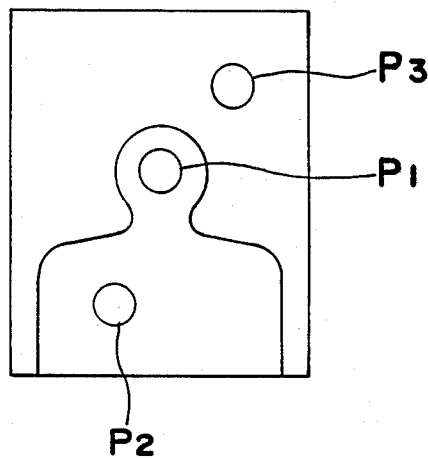
FIG. 3 is a schematic diagram showing various portions of a photographic object.

Before providing the description of the preferred embodiment, a way of using the light measuring device is explained. Referring to FIGS. 2(a) through 2(c) and FIG. 3, a light receiving window 1 (see FIG. 7 detail of which will be described later) of a light measuring device is put at a desired portion of a photographic object and a flash light is illuminated whereby light is measured. The light measurement is made with respect to three portions p1, p2 and p3 of a photographic object wherein the portion p1 is a relatively dark and near portion of the main object, p2 is a relatively light and near portion of the main object and p3 is a background (a far position) which is relatively light. FIGS. 2(a) through 2(c) show examples of the respective measured light values of the portions p1 through p3, wherein Fn (n=1,2 and 3) shows flash light value, An and En show ambient light value. In each graph, the horizontal axis is taken as time.

Figure 1:
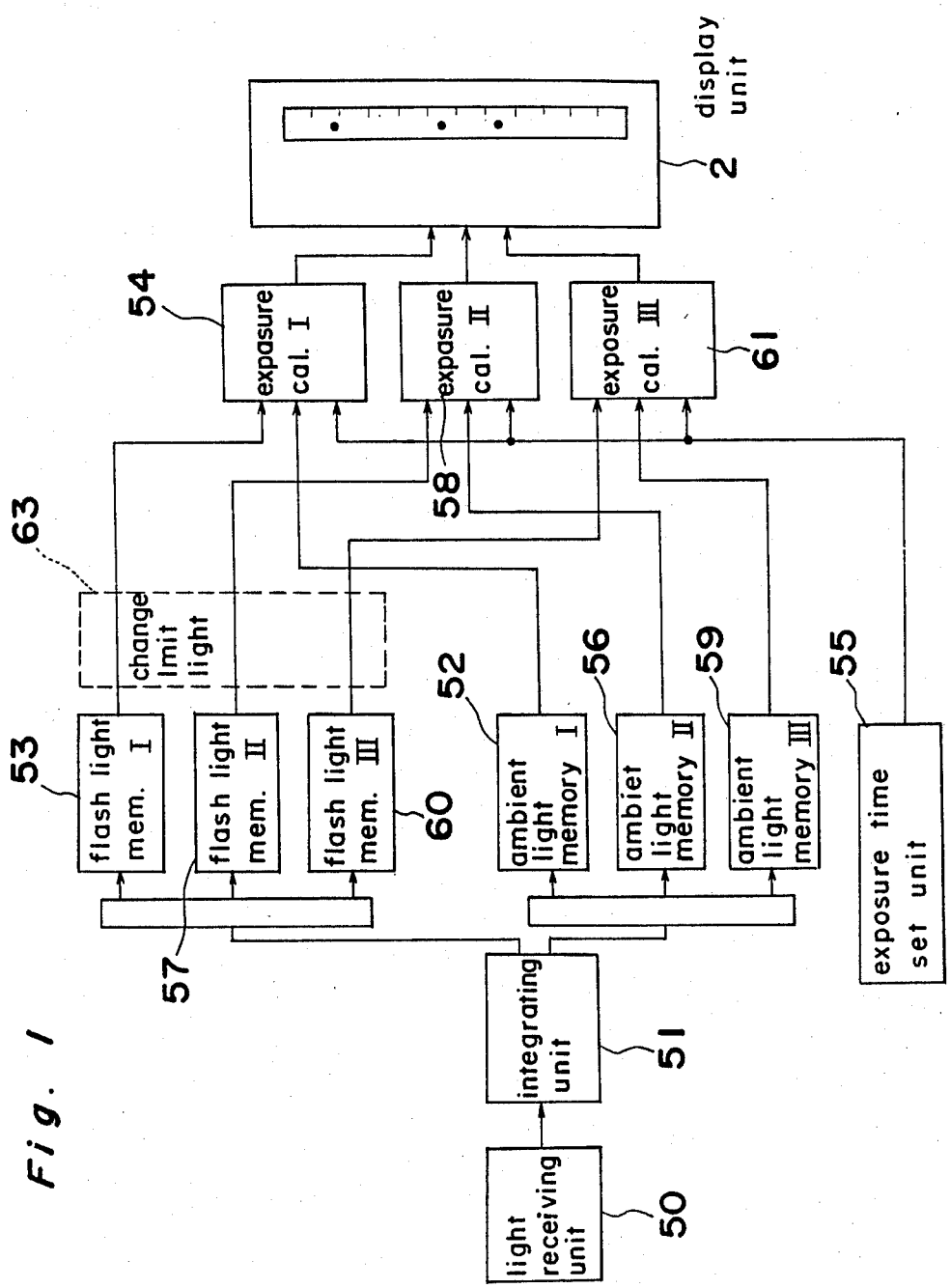
FIG. 1 is a schematic block diagram showing one example of a light measuring device according to the present invention.

Referring to FIG. 1, a light receiving unit 50 is provided for measuring the light of a photographic object by way of an incident light measuring method and comprises a light receiving window (not shown) of a light dispersing type and a light receiving element disposed behind the light receiving window. The light receiving unit 50 is positioned at a point p1 of the photographic object if the light measuring point is p1. An integrating unit 51 integrates the output of the light receiving unit 50 for a period of time t1 during which a flash light is illuminated, so as to calculate a sum F1 of the amount of the flash light during t1 and the amount of the ambient light. Subsequently, the integrating unit 51 integrates the output of the light receiving unit 50 for a period of time t2 during which the flash light is not illuminated so as to calculate the amount A1 of the ambient light for the period t2. The amount A1 of the ambient light is stored in a first ambient light memory 52. The integrating unit 51 further calculates the amount F1' of the flash light by the following equation $$F1'=F1-A1\times t1/t2.$$

The flash light amount F1' is stored in a first flash light memory 53.

A first exposure light value calculation unit 54 (referred to as exposure unit hereinafter) calculates an exposure value E1 by an exposure time T set by an exposure time set unit 55, the light amount A1 of the ambient light and the period of time t2 using the following equation $$E1=A1\times T/t2.$$

Also the first exposure unit 54 calculates a desired exposure value for effecting a correct photographing of the portion p1 of the photographic object under the flash light and the exposure time T by summing the flash light amount F1' stored in the first flash light memory 53 and the exposure value E1 by the calculation F1'+E1.

Upon positioning the light receiving unit 50 at the point p2 of the photographic object, the integrating unit 51 calculates the sum F2 of the flash light amount and the ambient light for the period t1 and subsequently calculates the ambient light amount A2 for a period t2 in a similar manner as described above. The ambient light amount A2 is stored in a second ambient light memory 56. Also, a flash light amount F2' is calculated by the integrating unit 51 by the equation $F2'=F2-A2\times t1/t2$, being stored in a second flash light memory 57.

A second exposure unit 58 calculates an exposure value E2 by the equation $E2=A2\times T/t2$ on the basis of the exposure time T from the exposure time set unit 55, the ambient light amount A2 from the ambient light memory 56 and the time t2. Also the second exposure unit 58 calculates a desired exposure value for effecting a correct photographing of the portion p2 of the photographic object under the flash light and the exposure time T by summing the flash light amount F2' stored in the second flash light memory 57 and the exposure value E2 by the calculation F2'+E2.

The light measurement for the portion p3 of the photographic object is performed in a similar manner as described above and the ambient light amount A3 is stored in the third ambient light memory and the flash light amount F3' is stored in a third flash light memory 60. Also the third exposure unit 61 calculates a desired exposure value for effecting a correct photographing of the portion p3 of the photographic object under the flash light and the exposure time T by summing the flash light amount F3' stored in the third flash light memory 60 and the exposure value E3 by the equation F3'+E3.

It is noted that the portion p1 is relatively dark in the close photographic object, whereby the flash light amount F1' is large against the small ambient light A1 as shown in FIG. 2(a). The portion p2 is relatively light in the close object and the flash light amount F2' and the ambient light A2 are respectively large. The third portion p3 is relatively light and in the far background and the flash light amount F3' is small and the ambient light A3 is large.

Figure 4:
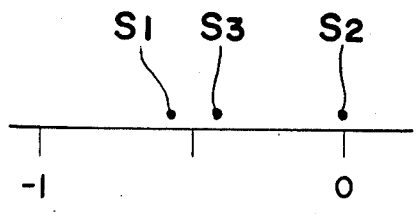
FIGS. 4 and 6 are schematic diagrams showing examples displayed by the light measuring device according to the present invention.
Figure 6:
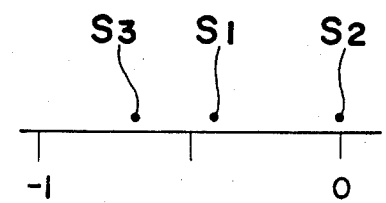
Figures 5A, 5B, 5C:
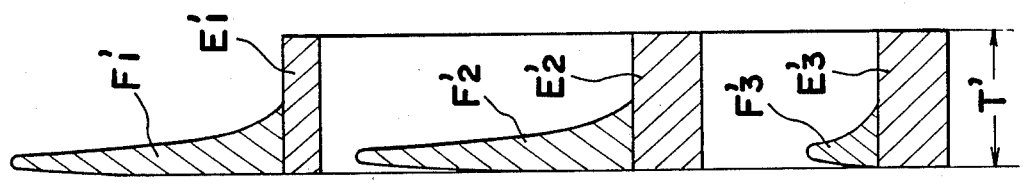

A display unit 2 is provided for displaying the desired exposure values F1'+E1 for the point p1, F2'+E2 for the portion p2 and F3'+E3 on a common scale as explained hereinafter. FIG. 4 shows one example of the display on the display unit 2, wherein the dark dot S1 represents the exposure value for the point p1, the dark dot S2 for the portion p2 and the dark dot S3 for the portion p3. The distance between the dots S1 and S2 represents the difference of the desired exposure value or contrast of the light of the portion p1 against the portion p2 which is dealt as a reference. Similarly the distance between the dots S2 and S3 represents the difference of the desired exposure value or the contrast of the light of the portion p3 against the portion p2. By this display, the contrast of the light of the portions p1, p2 and p3 can be directly seen by the distance between two dots. FIGS. 5(a) through 5(c) show the desired exposure value of the portions p1, p2 and p3 when the exposure time is set as T' shorter than the time T. Since the contribution of the ambient light to the necessary exposure value depends on the product of the intensity of the ambient light and the exposure time, the contribution of the ambient light becomes relatively small relative to the amount of the flash light when the exposure time is decreased. As the result, the desired exposure values for the portions p1 and p3 when the exposure time is T' changes from the desired exposure value for the portions p1 and p3 when the exposure time is T. Under such a state, the displayed marks S1 and S3 in the display unit 2 are displaced as shown in FIG. 6 from the positions as shown in FIG. 4, whereby it can be quantitatively seen that the relation between the exposure values for portions p1 and p3 is reversed. Further, it can be understood that the contrast of portions p2 and p3 becomes large compared to the contrast when the exposure time is T.

In the above example, the change of the contrast of the portions p1 and p3 against the change of the exposure time with the flash light value kept unchanged is displayed. The display unit 2 shown in FIG. 1 can display the change of the contrast, in a similar manner as shown in FIGS. 4 and 6, against the change of the flash light value with the exposure time kept unchanged, since the relation between the contribution of the flash light and the contribution of the ambient light is relative. For displaying the change as described, it is required to add a unit 63 for changing the flash light amount as shown in the phantom line in FIG. 1 so as to change the information of the flash light memories 53, 57 and 60 uniformly corresponding to the change of the flash light value to be used.

As described above, according to the light measurement device of the present invention, for photographing with the flash light as an auxiliary light source, a change of the contrast of the photographic object due to the change of the exposure time and/or flash light value can be visually and quantatively displayed so far as the same photographic object is concerned, by one measurement of the each portion of the photographic object, and storing the result of the measurements in the flash light memories 53, 57 and 60. After the desired contrast is recognized, a correct photographing can be made by setting a desired aperture value against the desired portion of the photographic object. The desired aperture value can be automatically obtained by modifying any one of the desired exposure values $F1'+E1$, $F2'+E2$ and $F3'+E3$ corresponding to the desired portion of any one of the portions p1, p2 or p3 by a film sensitivity provided that the contrast shown in FIG. 4 is suitable for photographing.

Although the embodiment of the light measuring device described above employs the light receiving unit 50 of the incident light type, it is possible to use a light receiving unit of a light reflecting type formed by combining a focusing optical system and a light receiving element positioned at the focus point behind the focusing optical system. In the light measurement using the light receiving unit of the light reflection type, light measurement of more than two portions of the photographic object can be made at a time by placing a plurality of light receiving elements at the focussed plane.

In one modification, the flash light amount $F1'$ can be obtained by filtering the output of the light receiving unit 50 by a high pass filter, then integrating the filtered output.

In the light measurement according to the present invention, what is essentially necessary is the information of the intensity of light. Therefore, the output value per se of the light receiving unit 50 can be used as the information of the ambient light in place of integrating the output of the light receiving unit 50 for the period of time t2. In this case, by representing B as the intensity of the ambient light i.e., the output value of the light receiving unit 50 without flash light, the exposure value E1 can be obtained by calculation of $T \times B$, wherein $B = A1/t2$. In place of using the integrating time t1 for obtaining the flash light value, the set exposure time T can be used.

Figure 7:
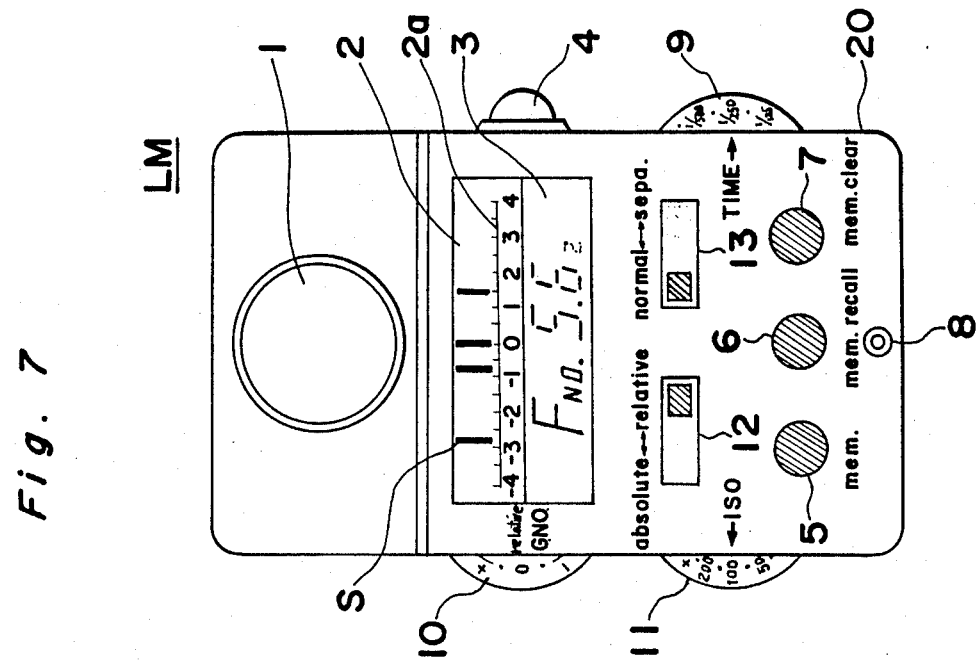
FIG. 7 is a front view of one example of the light measuring device according to the present invention.

Referring now to FIG. 7 showing the outside view of the light measuring device according to the present invention, wherein a light receiving window 1 is disposed at the upper portion of the box like body 20 of the light measuring device LM and the display unit 2 is disposed on the central portion of the body 20. The display unit 2 is made of a liquid crystal display device, having an analog scale 2a extending in the horizontal direction with numerals $-4$ to 0 to $+4$ depicted. Displayed above the scale 2a are marks S in the shape of vertically elongated bars. The position of the respective marks S represent the desired exposure values of a camera corresponding to the light measured values for the respective measured portions of the photographic object. The desired aperture value can be displayed below the scale 2a in digital form. Reference numeral 4 is a start key for starting light measurement, 5 denotes a memory key for executing to store the data of the result of the light measurement in a RAM of a CPU, 6 denotes a recall key for displaying the data of the light measurement stored in the RAM on the display unit 2, 7 denotes a memory clear key for clearing the data stored in the RAM off, 8 is a connection terminal for deriving a signal of a synchro contact. 9 is a dial for manually setting the exposure time, 10 is a dial for manually setting a ratio between the amount of the flash light at the time of light measurement and the amount of the flash light at the time of photographing and 11 is a dial for setting film sensitivity. 12 denotes a change over switch for manually changing the display of the display unit 2 between the absolute scale display and the relative scale display. 13 denotes a change over switch for changing the display of the display unit 2 between the normal display and the separation display.

The term of absolute scale normal display is a way of displaying the respective desired absolute aperture values of the respective portions of the photographic object obtained from the film sensitivity and the light amount which contributes to the exposure at the time of flash light photographing under a set exposure time on the absolute aperture value scale simultaneously.

The relative scale normal display is a way of displaying a plurality of relative light values for the respective portions on the relative scale of the display unit 2. The relative light values are indicated with one of them located at zero position as a standard.

The separation display is a way of displaying the various values about any one of the portions of the photographic object. In the absolute separation display, the various values are the first desired aperture value for the exposure under the total amount of the light, second desired aperture value for the exposure under the flash light alone and the third desired aperture value for the exposure under the ambient light alone with respect to the same portion of the object. These values are displayed on the display unit simultaneously. In this separation display, it is also possible to display the three values on the relative scale display with the first value taken as the standard.

Figure 8A:
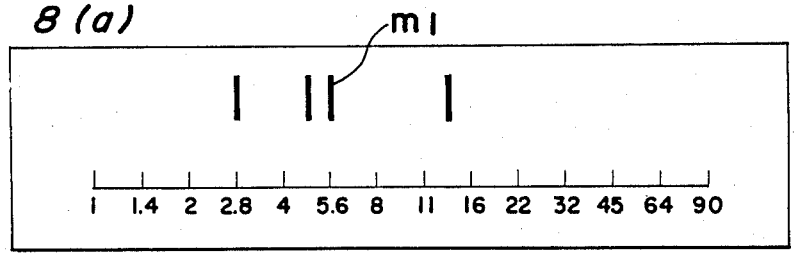
FIGS. 8(a) through 8(d) and 9 show examples displayed by the display unit used in the light measuring device according to the present invention.
Figure 8B:
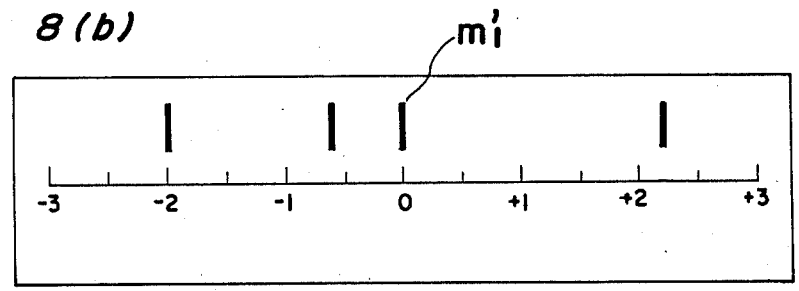

FIGS. 8(a) through 8(b) show examples of display in the display unit 2 wherein FIG. 8(a) shows the absolute scale normal display of desired aperture values and FIG. 8(b) shows the relative normal display of the desired aperture values corresponding to the values shown in FIG. 8(a). For example, in a case where the desired aperture value is F 5.6 for the present light measurement, a dark elongated mark m1 is displayed above the numerals 5.6. If this value is selected as the reference, the mark m1' above the numeral 0 (which means 0EV) is displayed in case of relative scale normal display as shown in FIG. 8(b). In this case, the display unit 3 displays F 5.6 in digital form.

Figure 8C:
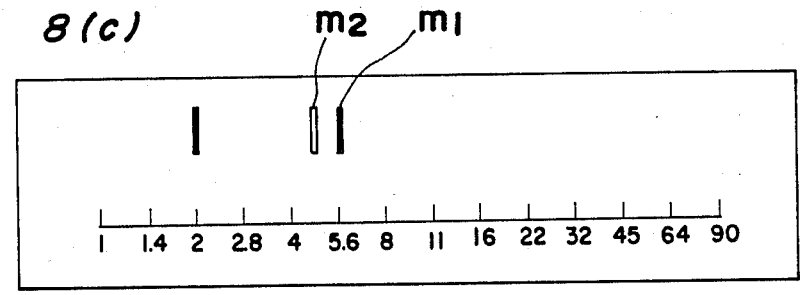
Figure 8D:
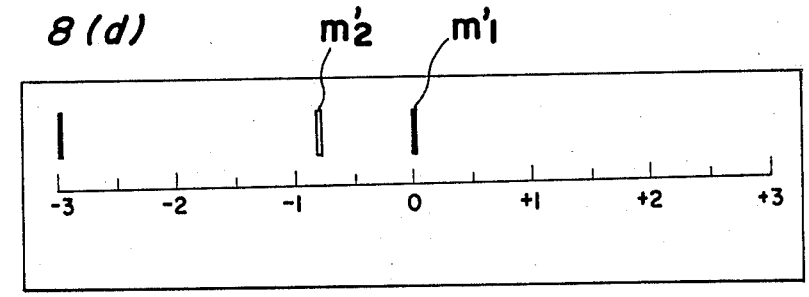

FIGS. 8(c) and 8(d) show the examples of the absolute scale separation display and the relative scale separation display respectively, wherein the blank marks m2 and m2' show the desired aperture value for the total amount of light when a flash light is used. The mark m2 and m2' are repeatedly turned on and off so as to classify them from the other marks such as m1 or m1' which are turned on continuously for the desired aperture value for the ambient light and/or total light.

In case of the separation display, when more than two marks are to be displayed at the same position, the mark of the aperture value for the flash light can be displayed with priority so as to facilitate a recognition of the mark displayed and the technical meaning of that mark. More specifically, in a case where a mark which is displayed on the scale position coincided with the content of the aperture value displayed on the display unit 3 is repeatedly turned on and off, and there is only one mark continuously turned on, the display represents that the desired aperture value for the flash light is generally equal to the desired aperture value for the total light and therefore there are two overlapped marks at the scale position where the mark is flashing.

In a case where a mark $m_i$ (not shown) which is displayed on the scale position coincided with the content of the aperture value displayed on the display unit 3 is continuously turned on, and another mark $m_i'$ is repeatedly turned on and off at the scale position lower by $-1$ EV than the scale position of the mark $m_i$, the display represents that the desired aperture value for the flash light is almost equal to the desired aperture value for the ambient light and there are two overlapped marks at the position of the flashed mark $m_i'$.

In other cases all three marks are displayed at the separated scale positions.

In case of the relative scale display, when the mark on 0 Ev scale position is flashing with only one mark turned on continuously, the display represents that the desired aperture value for the flash light and the desired aperture value for the total light are almost equal to each other, then there are overlapped marks. In a case where the mark on the scale position of $-1$ Ev is flashing with only one mark turned on continuously, the display represents that the desired aperture value for the flash light and the desired aperture value for the ambient light are almost equal and there are overlapped marks.

Figure 8E:
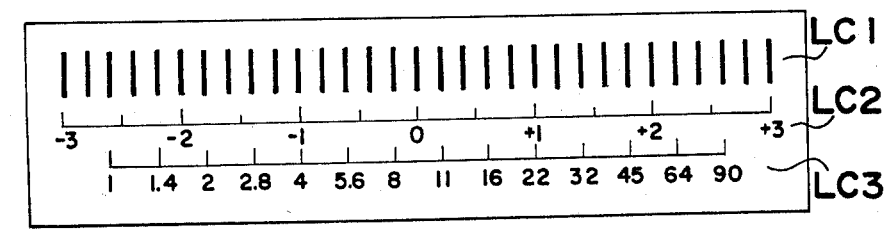

FIG. 8(e) shows the appearance of the analog scale display unit 2a in which all of the displaying segments are illuminated. The analog scale display unit 2a is composed of a dot display unit LC1 having a plurality of dots parallely aligned, a relative scale display unit LC2 and an absolute scale display unit LC3. In the relative scale display mode, the relative scale display unit LC2 is enabled, also the dot display unit LC1 is enabled to display one or more dots corresponding to the exposure value to be displayed on the relative scale as shown in FIGS. 8(b) and 8(d). On the other hand, in the absolute scale display, the absolute display unit LC3 is enabled, also the dot display unit CL1 is enabled to display one or more dots corresponding to the aperture value to be displayed on the absolute scale as shown in FIGS. 8(a) and 8(c). The length of the scale corresponding to 1 Ev on the relative scale is set by 2.5 times of the length of the scale corresponding to 1 Ev on the absolute scale.

Figure 9:
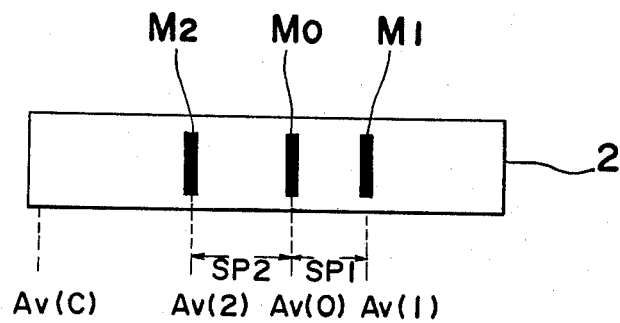
Figure 10:
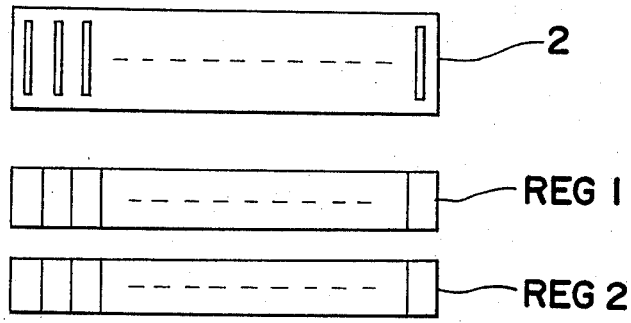
FIG. 10 is a schematic diagram showing a relation between the respective marks displayed in the display unit and registers used in the light measuring device according to the present invention.

In the analog scale of the display portion 2a, the unit space of the aperture step numbers is 0.5 Ev for the absolute scale display and is 0.2 Ev for the relative scale display. Conversion of the measured data to the data suitable for display unit 2 is made in such a manner that in case of absolute scale display, assuming that the aperture value of the first light measurement is Av(0) against the aperture value Av(c) of the reference light measurement, the mark M0 is displayed as shown in FIG. 9 by displacing the aperture value Av(0) by a space of (Av(0)−Av(c))/0.5 Ev from the position corresponding to the aperture value Av(c). The aperture value Av(1) corresponding to the light value at the second light measurement is displayed by the mark M1 by displacing the scale position from Av(0) by a space SP1/0.5 Ev wherein SP1 is the difference between the aperture values Av(1) and Av(0). The aperture value Av(2) corresponding to the light value at the third light measurement is displayed by the mark M2 by displacing the scale position from Av(0) by a space SP2/0.5 Ev wherein SP2 is the difference between the aperture values Av(2) and Av(0).

As in FIG. 8(e), the display unit 2 is formed by a plurality of display segments of the liquid crystal display elements which is commonly used for the absolute scale and the relative scale. There are provided two registers REG1 and REG2 each having the number of storage stages corresponding to the number of the segments of the liquid crystal display elements of the display unit 2. In order to turn on a mark, signals "1" are put in the storage stages of the registers REG1 and REG2 corresponding to the position of the mark to be turned on. In order to flash a mark in case of separate display, "1" is put in the storage stage of the register REG1 and "0" is put in the storage stage of the register REG2 corresponding to the position of the mark to be displayed, thereby said signals "1" and "0" are used alternately with a suitable frequency such as 2 Hz.

Figure 11A:
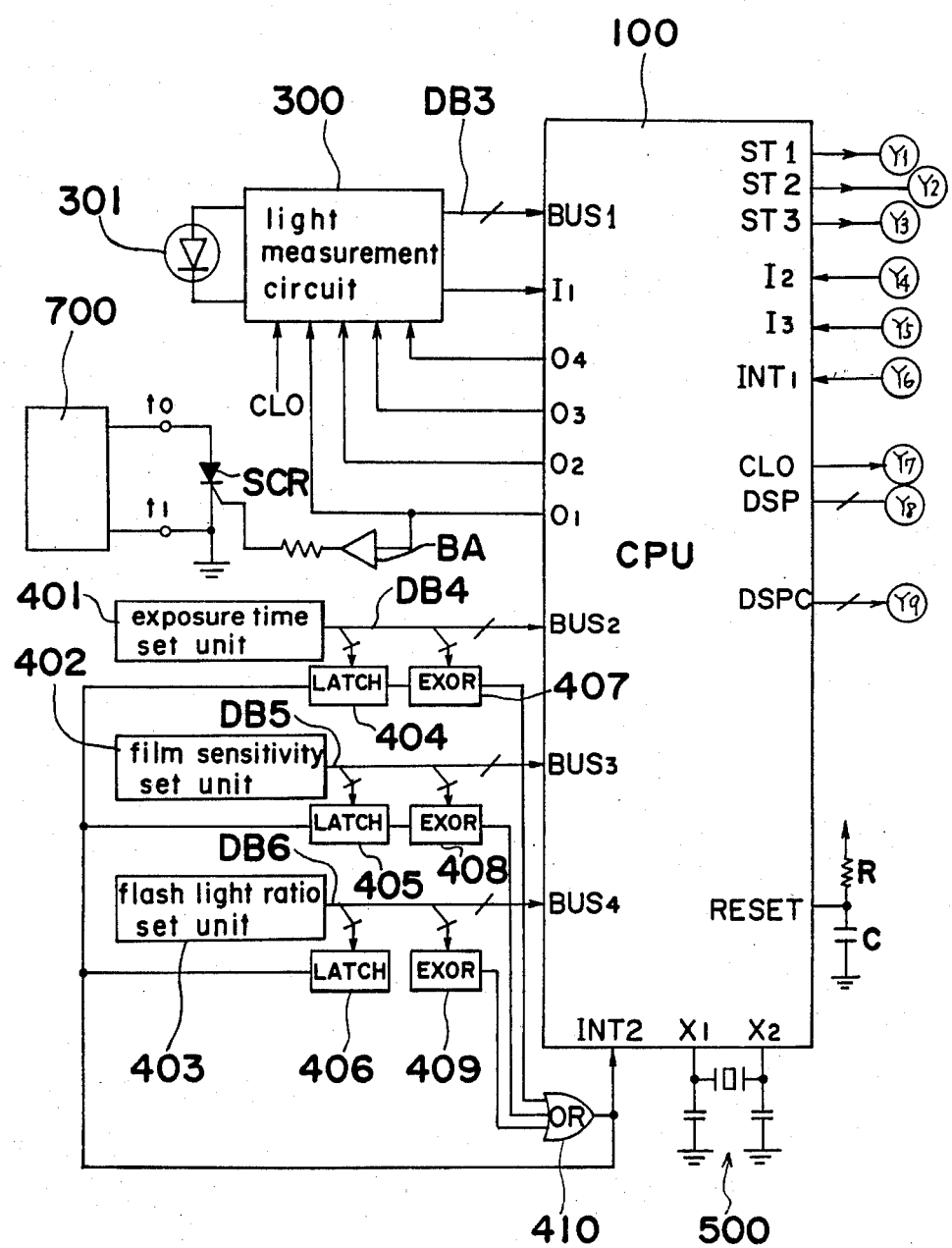
FIG. 11 is comprised of FIGS. 11(a) and 11(b) showing a block diagram showing a detailed circuit of the light measuring device according to the present invention.
Figure 11B:
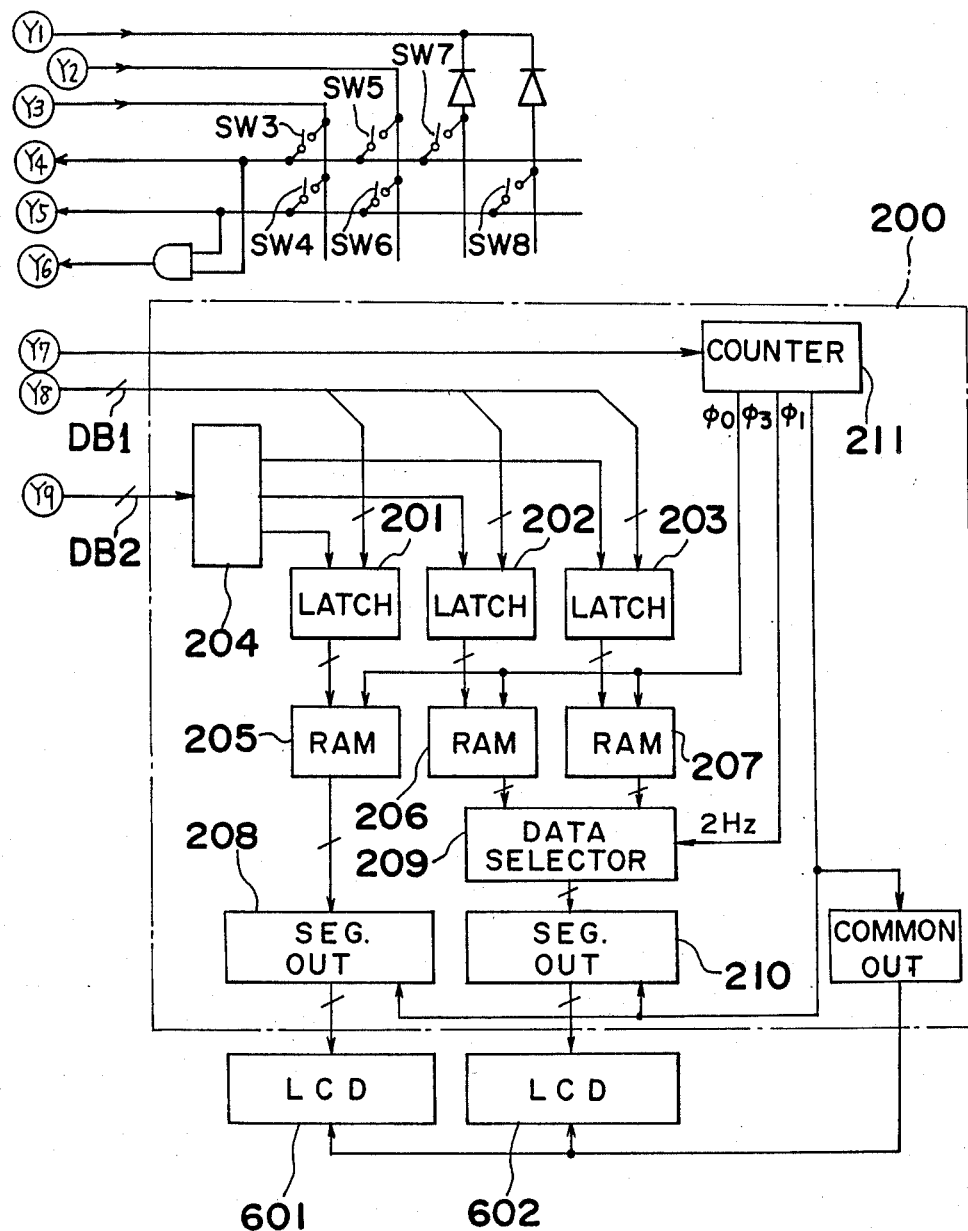

FIG. 11 is a block diagram showing a circuit arrangement of one embodiment of the light measurement device according to the present invention, wherein a terminal ST1 of a CPU (central processing unit) of the light measurement device provides a series of strobe pulses for enabling either the switch SW7 corresponding to the slidable element 12 for changing over the absolute scale display and the relative scale display and switch SW8 corresponding to the slidable element 13 for changing over the normal display and the separate display. The terminal ST1 produces an output signal when the state is low. The terminal ST2 and ST3 provide the respective strobe pulses for effecting the switches SW3 corresponding to the start key 4, the switch SW4 corresponding to the memory key 5, switch 5 corresponding to the clear key 7 and the switch SW6 corresponding to the recall key 6. Each of the terminals ST2 and ST3 produce outputs when they are low. Input terminals I2 and I3 receive the signal representing the respective switches upon depression of any one of the switches SW3 through SW8 with application of the strobe signals from the terminals ST1 through ST3. Each of the terminals I2 and I3 is made high when no key is depressed and when any one of the switches SW3, SW5 and SW7 is depressed, the input terminal I2 is made low and when any one of the switches SW4, SW6 and SW8 is depressed, the input terminal I3 is made low. In this embodiment "1" corresponds to the high signal and "0" to the low signal. An interrupt input terminal INT1 is made low when any one of the switches SW3 through SW6 is depressed, whereby CPU 100 executes the key interrupt program which will be explained later. While the key interruption program is operated, other key interruption is inhibited. The output port CLO provides synchronizing clock pulses for synchronizing CPU 100 and other circuits. Data output port DSP provides display data for the display unit 3. The data output port DSP having a number of bits is coupled to latches 201, 202 and 203 of the LCD driver 200 for driving the segments of the display unit 2 through a data bus DB1. Each bit of the data output port DSP corresponds to each LCD segment of the display unit 3. The output port DSPC outputs control signals to a decoder 204 of the LCD driver 200 through the data bus DB2 so as to latch the data from the data output port DSP in the latch 201 through 203. For example, when data $(01)_B$ ( $( )_B$ means binary number) is output from the output port DSPC, the data of the output ports DSP can be latched in the latch 201. Similarly when data $(10)_B$ is output from the output port DSPC, the data from the output port DSP can be latched in the latch 202 and the data from the output port DSP can be latched in the latch 203 with the control signal $(11)_B$. An input terminal RESET is input with a power on reset signal from a power on reset circuit formed by a resistor R and a capacitor C so as to reset CPU 100.

Input port BUS1 is coupled with the output port of a light measurement circuit 300 through a data bus DB3 for taking the output data of the light measurement in CPU 100. The light measurement circuit 300 converts the analog value obtained from the light receiving element 301 which is included in the light receiving unit 2 and is disposed behind the light receiving window 1 to digital data. Terminal I1 receives a high level signal representing that an analog to digital conversion (referred to as A/D conversion) in the light measurement circuit 300 is completed. Terminal 04 provides an instruction of high level for initiating the A/D conversion to the light measurement circuit 300. Terminal 03 provides an instruction to the light measurement circuit 300 for changing the A/D conversion of either the measured flash light value and the measured ambient light value. With a high level signal the A/D conversion of the measured flash light value is executed and with the low level signal, the A/D conversion of the measured ambient light value is executed in the light measurement circuit 300. Terminal 02 provides a timing instruction of a high level signal to the light measurement circuit to start discharging an integrating capacitor in the light measurement circuit 300.

Terminal 01 provides instructions to the light measurement circuit 300 for starting and ending the integration. The period of time from the rising edge of the signal at the terminal 01 to the falling edge thereof defines the integration time.

A port BUS 2 is coupled to an exposure time set unit 401 through a data bus DB4 for receiving the data of the exposure set time set by the exposure time set dial 9.

A port BUS 3 is coupled to a film sensitivity set unit 402 through a data bus DB5 for receiving the data of the film sensitivity set by the film sensitivity set dial 11. A port BUS 4 is coupled to a flash right ratio set unit 403 through a data bus DB6 for receiving the data of the ratio of the flash light value ratio set by the flash light ratio set dial 10. A port INT2 is adapted to receive an interruption instruction when the data described above are changed. CPU 100 acts to inhibit the interruption during prosecution of the program of the light measurement and calculation of the light measurement data by the light measuring unit 50 and the integrating unit 51. However, the interruption instruction occurred during the inhibiting period mentioned above can be set in the flag (not shown) in CPU 100, whereby after the program of the light measurement and calculation is finished, the interruption can be executed. Circuit arrangement formed by latches 404, 405 and 406 and exclusive OR gates 407, 408 and 409 serves to provide said interruption instruction when the external data is changed. Specifically, the input terminals of the latch 404 and the exclusive OR gate 407 are coupled to the bus DB4 for receiving the data of the exposure time set unit 401 and the exclusive OR gate 407 has a first group of input terminals connected to the data bus DB4 and a second group of input terminals connected to the outputs of the latch 404 with the output terminals of the exclusive OR gate 407 connected with an input terminal of an OR gate 410 the output of which is connected to the interruption terminal INT2 of CPU100. By this arrangement, the exclusive OR gate 407 compares the data on the data bus DB4 with the output data of the latch 404, thereby producing a high level signal when the both data are different in any one of the bits due to change of the data of the exposure time set unit. The high level signal is applied to the input port INT2 of CPU 100 as the interruption instruction so as to propose the interruption. The high level signal of the OR gate 410 is applied to the clock input of the latch 404, causing the latch 404 to take in the changed data of the exposure time set unit 401, feeding the changed data to the exclusive OR gate 407, whereby the output of the exclusive OR gate 410 becomes low by coincidence between the data fed from the latch 404 and the data from the exposure time set unit 401 resulting in making the interrupt input port INT2 low. The interruption instruction can be produced as mentioned above upon change of the data of the exposure time set unit 401. In this arrangement, at the time of application of the power to the light measurement device, although the content of the latch is indefinite, since the data of the exposure set unit 401 may be different from the data stored in the latch 404, the exclusive OR gate produces once an interruption instruction of high level, which is applied to the latch 404 as a latching pulse. Thus finally the output of the exclusive OR gate 407 is made low to make CPU 100 ready to wait for the interruption. If the content of the latch 404 coincides with the data of the exposure time set unit at the time of application of the power to the device, the output of the exclusive OR gate 407 is made low, thus CPU 100 is made ready to wait for the interrupt.

The latch 405 and the exclusive OR gate 408 produces the interruption instruction to CPU 100 when the data of the film sensitivity unit 402 is changed.

The latch 406 and the exclusive OR gate 409 produces the interruption instruction to CPU 100 when the data of the flash light set unit is changed.

Terminals X1 and X2 of CPU 100 receives clock pulses produced by a pulse generator 500 having a quartz oscillator.

The liquid crystal display device (referred to as LCD hereinafter) 601 represents the digital display unit 3 for displaying the digital data of the desired aperture value when the desired exposure value is calculated and the LCD 602 represents the display unit 2 for displaying the desired aperture value of the measured light in analog form either in the normal display or separate display in either the absolute scale or relative scale displays.

Reference numeral 200 denotes an LCD drive circuit for providing signals for the respective LCDs 601 and 602, wherein the circuit arrangement for driving LCD 601 is composed by a latch 201 for holding the displaying data, RAM 205 for storing the segment data and a segment driver 208 and each bit of data buses coupling the respective latch 201, RAM 205 and the segment driver 208 corresponds to each segment of LCD 601. The circuit arrangement for driving LCD 602 is composed by a latches 202 and 203, RAMs 206 and 207, a data selector 209 and segment driver 210. The data selector 209 selectively derives the output of RAMs 206 and 207 alternatively with a frequency of 2 Hz, feeding the derived data to the segment driver 210 so that the necessary segment or segments of LCD 602 can be turned on and off by "0" and "1" stored in the corresponding area of RAMs 206 and 207. A decoder 204 is provided between the output port DSPC of CPU100 and the latches 201 through 203 for producing clock pulses for selecting the latches 201 through 203 on the basis of the data signals from the output port DSPC. A counter 211 produces READ/WRITE pulse $\phi_0$ for RAMs 205 through 207, LCD drive clock pulse $\phi_1$ and clock pulse $\phi_3$ for flashing the display.

Figure 12:
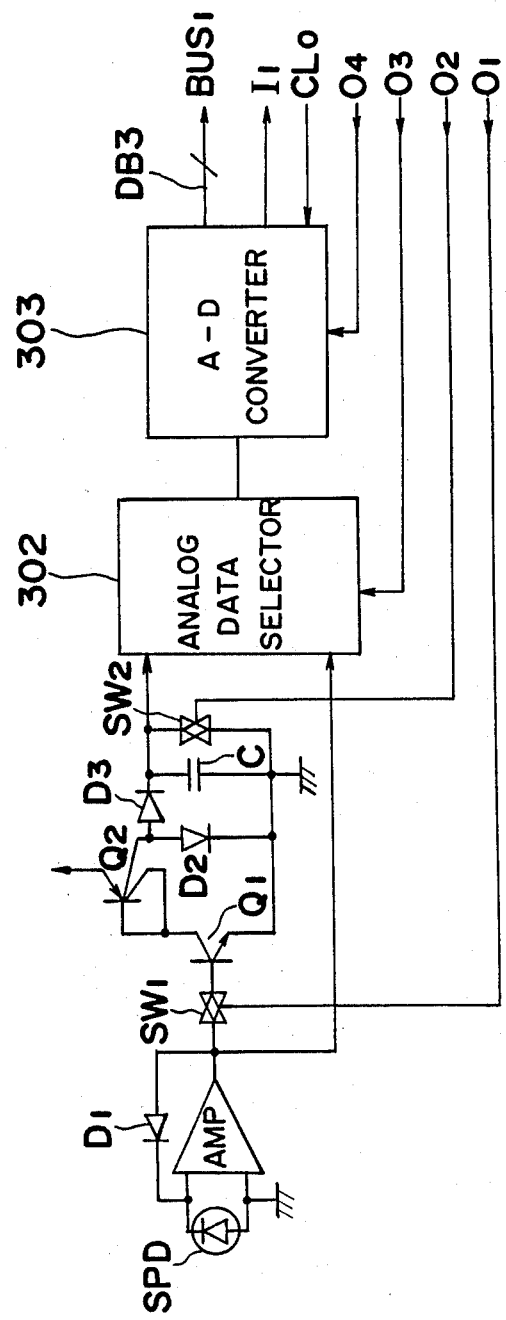
FIG. 12 is a detailed circuit diagram of a light measurement circuit shown in FIG. 11.

FIG. 12 shows a detailed arrangement of the light measurement circuit 300. SPD denotes a light sensor disposed behind the light receiving window 1, producing an output signal representing the intensity of light received. The output signal of the light sensor SPD is logarithmically compressed by the circuit arrangement composed of an amplifier AMP and a logarithmic compression diode D1 and the logarithmically compressed signal is applied to a logarithmic expansion circuit composed of a transistor Q1 and a mirror circuit Q2 and wherein the signal is logarithmically expanded. Subsequently the signal is integrated in a logarithmic compression integrating circuit composed of a logarithmic compression diode D2, diode D3 and an integrating capacitor C. The logarithmic integration circuit produces a signal representing an integrated value of the logarithm of the output of the light sensor SPD. The analog switch SW1 is conductive when the output port O1 of CPU 100 is high. The period of integration in the capacitor C is defined by the time length that the analog switch SW1 conducts. An analog switch SW2 is conductive when the terminal O2 of CPU 100 is high so that the charge stored in the capacitor C is discharged. An analog data selector 302 produces a signal representing the charged value of the capacitor when the output of the terminal O3 is "high" and alternatively produces the output signal of the operation amplifier AMP when the output of the terminal O3 is "low". The A/D converter 303 serves to convert the analog data signal fed from the analog data selector 302 into a digital form when the terminal O4 of CPU 100 is "high". After completion of the analog to digital conversion, the A/D converter 303 feeds the signal representing the completion of the A/D conversion to the input port I1 of CPU 100 and also feeds the digital data signal to the data bus DB3. The light measurement circuit 300 described above produces the data Q'vi which is the sum of the integrated value of the logarithmic value of the flash light value and the ambient light value during the period of time t1 shown in FIG. 2 and the output data Bv representing the logarithmic value of the intensity of the ambient light during the light measurement period t2. Fig. 13 shows the wave forms of the various signals transferred between CPU 100 and the light measurement circuit 300.

The operation of the light measurement device described above is explained hereinafter with reference to a flow chart thereof shown in FIGS. 14(a) through 14(b).

Various registers and flags used in CPU 100 are listed in the table 1.

TABLE 1

| REG0 | register for storing the number of display |
|------|---------------------------------------------|
| REG1 | register for analog display I |
| REG2 | register for analog display II |
| REG3 | working register for display |
| REG4 | counter for the number of the memory |
| REG5 | working register for display |

TABLE 1-continued

| REG6 | digital display register |
|------|--------------------------|
| REG7 | working register for recall procedure |
| NM | number of the memories |
| SPF | flag of separate display |
| RCF | flag of recall procedure |

Figure 14A:
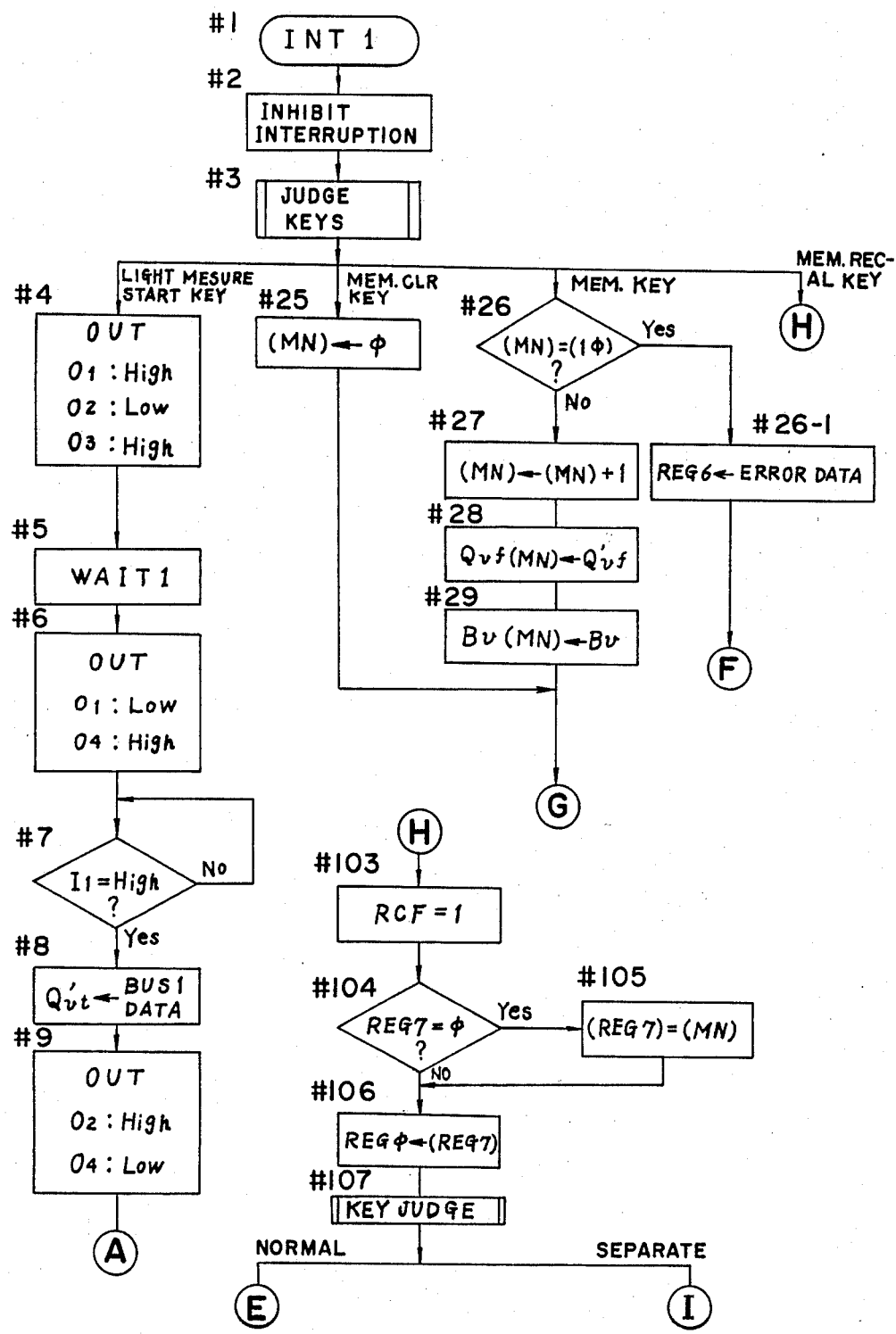
Figure 14B:
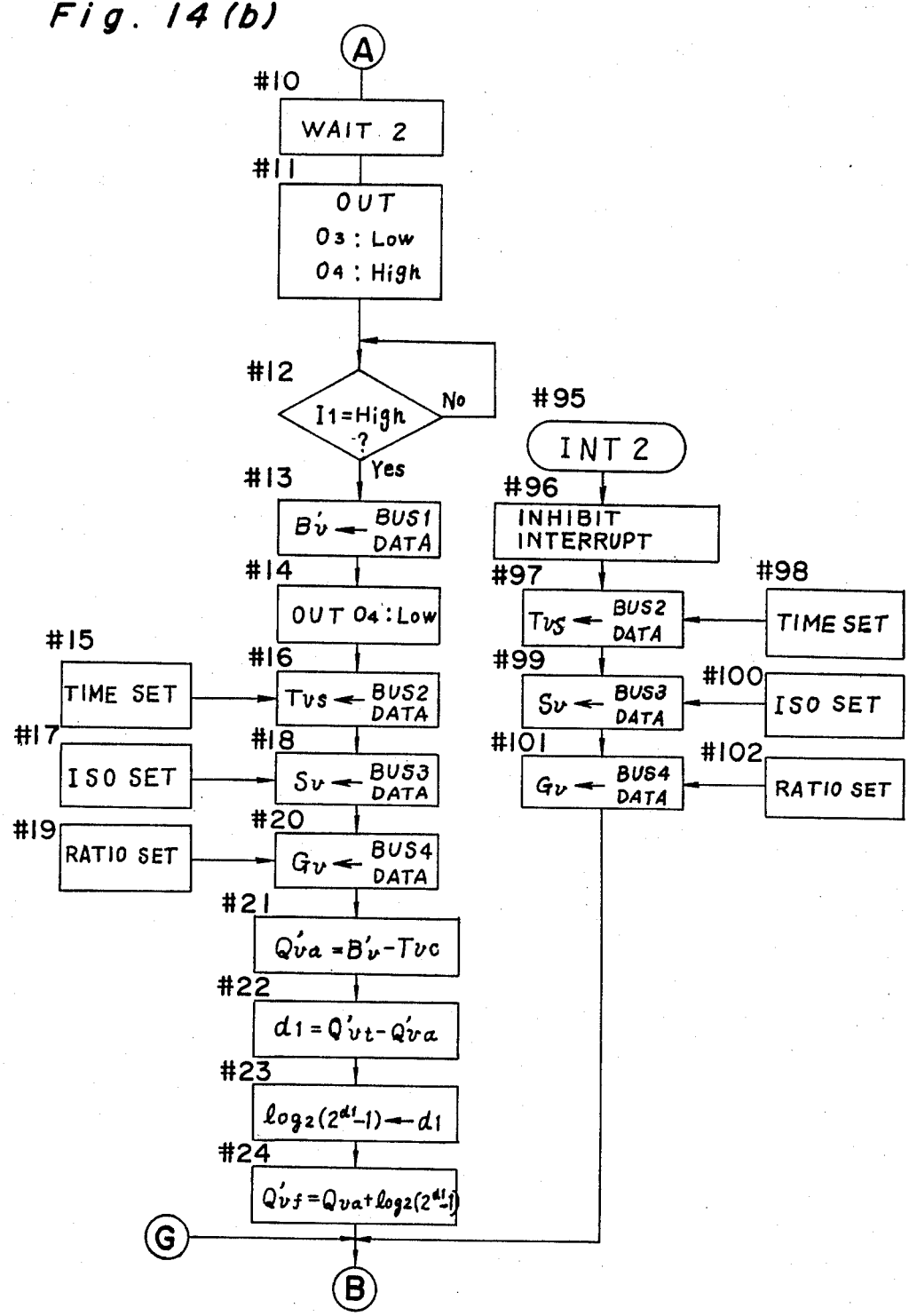

Summary of the operation of the program flow shown in FIG. 14(a) is as follows.

CPU 100 is reset upon generation of the power on reset signal and the strobe signals "1", "0" and "0" at the respective output terminals ST1, ST2 and ST3 respectively. Simultaneously, the interruption terminals INT1 and INT2 become ready to receive the interruption instructions. All the registers and RAMs in CPU 100 are respectively cleared. Upon operation of any one or more of the light measurement start key 4 for the switch SW3, the memory key 5 for the switch SW4, memory clear key 7 for the switch SW5 and/or the memory recall key 6 for the switch SW6, the interruption instruction (referred to as key interruption) is input to the terminal IT1, thereby executing the interruption program INT1 at the step #1. When any one or more of the exposure time, the ratio of the flash light and/or film sensitivity values are changed by operation of the exposure time setting dial 9, flash light ratio setting dial 10 and/or the film sensitivity setting dial 11, the interruption instruction is applied to the interruption input terminal INT2, thereby executing the interruption program shown in FIG. 14(b).

Once the key interruption is executed upon operation of any one of the keys 4 through 7, CPU 100 inhibited to enter the other interruption instruction at the interruption terminals INT1 and INT2, thereby inhibiting the interruption such as returning to the start of the program from the intermediate step currently executed of the light measuring or light calculating process or jumping to other interruption program for the change of the external set data. In the step #3, CPU 100 produces a "high" strobe pulse at the terminal ST1 with the terminals ST2 and ST3 "low". Upon operation of any one of the keys 4 through 7 for the switches SW3 through SW6, a Low level signal is applied to any one of the input terminals I2 or I3 corresponding to the operated key. Under the low state of the strobe input terminal ST2, in a case where the key input terminals I2 and I3 are (0 and 1)$_B$ CPU judges that the switch SW5 of the memory clear key 7 is operated and in a case where the key input terminals I2 and I3 are (1 and 0)$_B$, CPU 100 judges that the memory recall key 6 is operated. In a case where the strobe input terminal ST3 is "low" and the key input terminals I2 and I3 are (0 and 1)$_B$, CPU judges that the switch SW3 of the light measurement start key 4 is operated and the key input terminals I2 and I3 are (1 and 0)$_B$, the CPU judges that the switch SW4 of the memory key 5 is operated. By the judgement as described above, when the light measurement start key 4 is operated, the program flow advances to the step #4 of the light measurement routine. With the memory clear key 7 operated, the program flow advances to the step #25 of the memory clear routine. With the memory key 5 operated, the program flow advances to the step #26 of the memory display routine. With the memory recall key 6 operated, the program flow advances to the step 103 of the memory recall routine for displaying the value stored in the memory.

When the light measurement routine comprising the steps #4 through #14 is executed, the output terminal O1 becomes "high" at the step #4 producing the signal of starting the integration in the integrating unit 51, a thyristor SCR becomes conductive to produce a signal for starting the flash light from the terminals t0 and t1, thereby causing the flash device 700 to start to illuminate the flash light. In the step #4, the output terminal O2 is made "low" so as to turn off the analog switch SW2 to start the integration of the flash light. Also the output terminal O3 is made "high" so that a selection signal is input to the analog data selector 302 (FIG. 12) the voltage of the integrating capacitor C is input to the A/D converter 303. Then the program flow advances to the step #5 of WAIT1 wherein an integration period of time for integrating the light measurement output is elapsed. After the integration period is completed, the program flow advances to the step #6 wherein the output terminal O1 is made "low", causing the disappearance of the integration start signal, so that the analog switch SW 1 is turned off to hold the voltage of the capacitor C. Simultaneously the output terminal O4 is made "high" so as to start the A/D conversion of the voltage of the capacitor C in the A/D converter 303. It is judged whether or not the A/D conversion is completed at the step #4 by watching the level of the input terminal I1 of CPU. When the A/D converter 303 completes the A/D conversion, the signal representing the completion of A/D conversion is fed to the input terminal I1 of CPU 100, then the program flow advances to the step #8, wherein the value Q′vt which is the logarithmic intergrated value of the flash light is fed to the input port BUS1 of CPU 100 from the A/D converter 303. In the step #9, the integration starting signal on the output terminal O4 is made "low" so as to reset the A/D converter 303 making the integration reset signal at the terminal O2 "high" to turn on the analog switch SW 2, thereby causing the capacitor C to be discharged. A program step of WAIT II at #10 is provided for waiting for the time of resetting the A/D converter 303. After resetting it, the program flow advances to the steps #11 through #14 wherein the ambient light is measured. In the step #11, the terminal O3 of the analog data selector 302 is made "low" so that the output of the operation amplifier AMP is fed to the A/D converter 303.

The program steps 312 through #14 are the same operations as in the steps #7 through #9 for measurement of the flash light, therefore, the detail of which is herein omitted. The result of the measurement of the ambient light is fed to the A/D converter 303 as the brightness value B′v of the photographic object and is converted into a digital form. The brightness value B′v thus digitized is fed to CPU 100 through the data bus DB3. Upon completion of the light measurement of the flash light by the steps #4 through #10 and the light measurement of the ambient light by the steps #11 through #14, the process is advanced to the steps #14 through #20 for reading the set data set by the external setting units 401, 402 and 403. In the step #16, the exposure time Tvs set by the setting unit 401 is read in CPU 100 through the port BUS2. The film sensitivity Sv set by the setting unit 402 is read in CPU 100 through the port BUS 4 in the step #18. The ratio Gv of the flash light value set by the setting unit 403 is read in CPU 100 in the step #20. It is noted that the ratio Gv of the flash light value is settable in such a manner as ±1Ev, ±2Ev, ... by defining the measured flash light value as 0Ev. At the time of completion of the step #20, all the data necessary for display are completely taken in CPU 100. All of the data taken in CPU at this period are listed below.

Q′vt; Logarithmic integrated values of sum of the ambient light and the flash light; Wherein the suffix t denotes the total value of the ambient light and the flash light and ′ denotes the measured value.

B′v; Measured value of the brightness of the photographic object.

Tvs; Set exposure value. The suffix s denotes set value.

Sv; Set film sensitivity.

Gv; Set flash light value.

Tvc; Logarithmic value of the integrating period.

A calculation routine of steps #21 through #24 is provided for separating the logarithmic integrated value Q′vt of the measured light into the ambient light value Q′va and the flash light value Q′vf.

The specific aspect of the calculation of the calculation routine is explained below. A relation of the logarithmic integrated light value Q′vt of the sum of the flash light and the ambient light, the logarithmic integrated light value Q′vf of the flash light and the logarithmic integrated light value Q′va can be represented by the equation;

$$2^{Q'vt} = 2^{Q'vf} + 2^{Q'va} \tag{1}$$

Equation (1) is applicable to the linear value.

The logarithmic integrated light value Q′va can be obtained by the following equation;

$$2^{Q'va} = 2^{Bv} \times 2^{-Tvc}$$

wherein $2^{-Tvc}$ is the integrating period of time of the flash light value (obtained in the step WAIT1) and Bv is the brightness of the ambient light. By taking the logarithm of the both terms, $$Q'va = Bv - Tvc \tag{2}$$

can be obtained.

From the equation (1), the following equation can be obtained;

$$2^{Q'vf} = 2^{Q'vt} - 2^{Q'va}$$
$$= 2^{Q'va}(2^{Q'vt - Q'va} - 1)$$

By taking the logarithm of a 2 basis for both terms $$Q'vf = Q'va + \log_2(2^{Q'vt - Q'va} - 1) \tag{3}$$

can be obtained. In calculating the equation (3), firstly $d1 = Q'vt - Q'va$ is calculated and subsequently obtaining $\log_2(2^{d1} - 1)$ and these terms are put in the equation (3). Also the result of the equation (2) is put in as the value Q′va. The logarithmic integrated value of the flash light value can be obtained by the procedure mentioned above. The above calculation is performed by the steps #21 through #24.

In the step #21, the ambient light value Q′va is obtained by the difference of the result of the measured light Bv and the logarithmic value of the integrating period. The value d1 is obtained in the step #22 and the value $\log_2(2^{d1} - 1)$ is calculated in the step #23 by reading the logarithmic table provided in ROM of CPU 100 corresponding to the value d1.

Figure 14C:
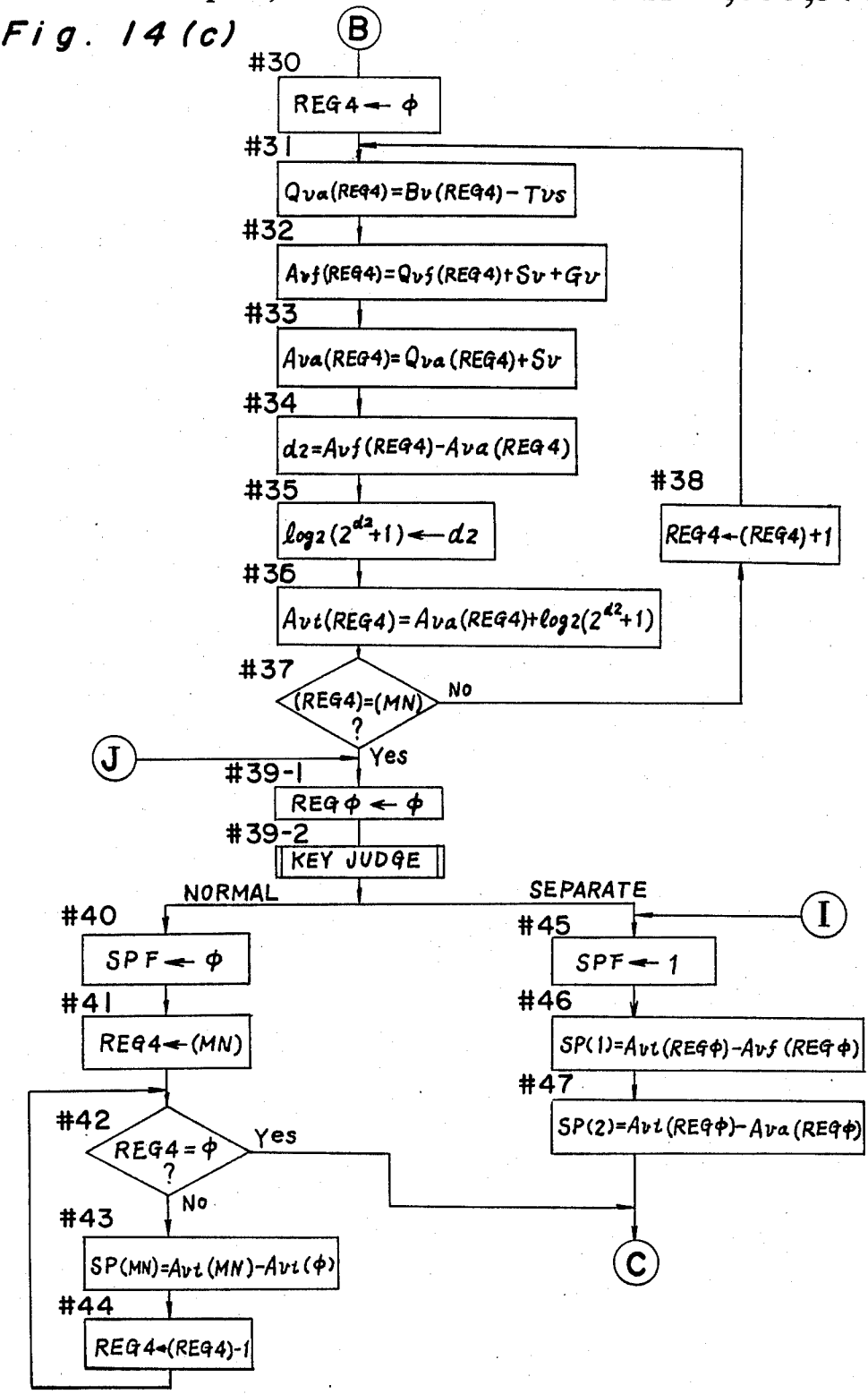
Figure 14:
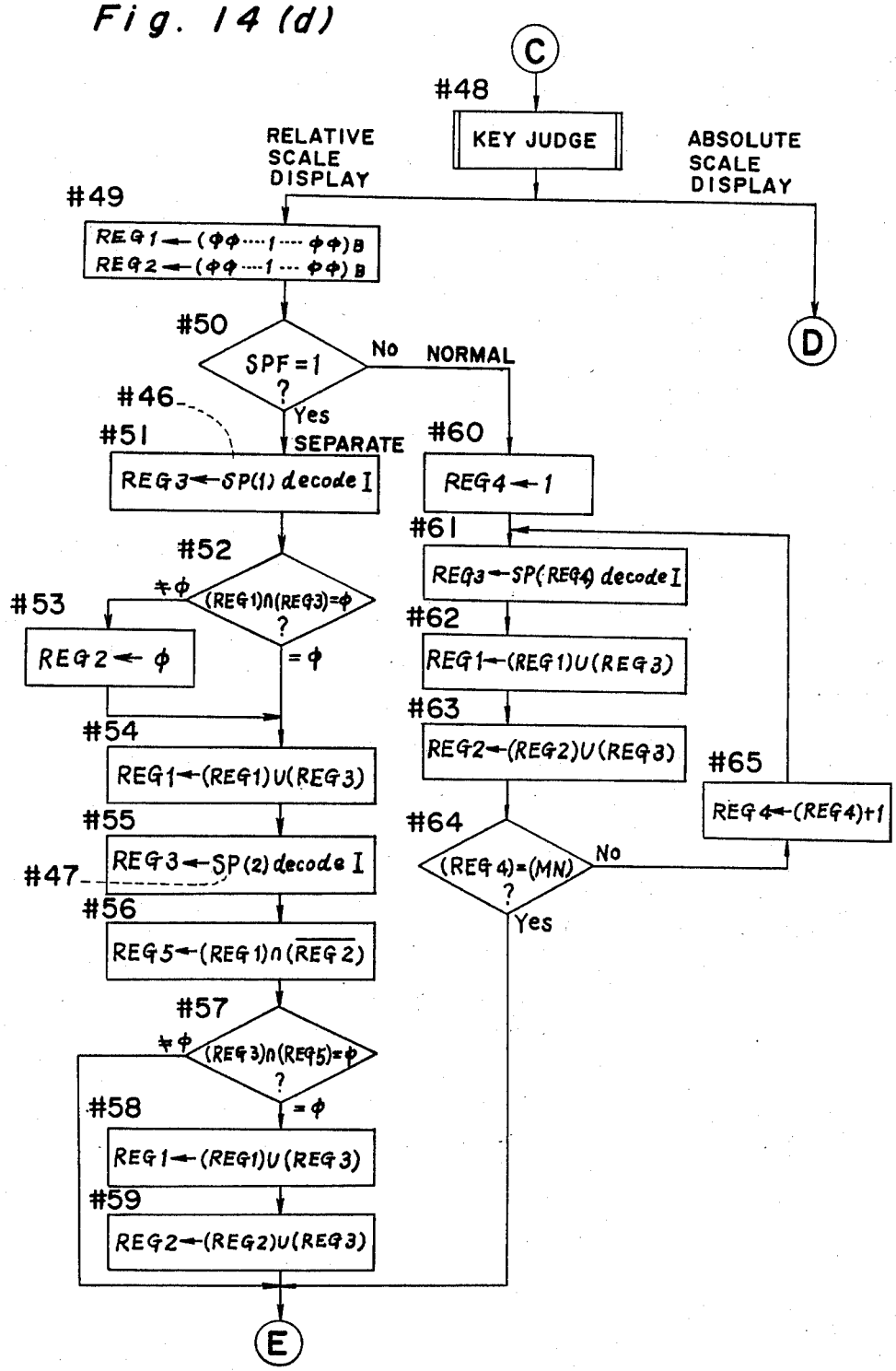

A process of conversion of the data of the measured light and memory data into the data for display is performed according to the program flow of the steps #30 through #37 shown in FIG. 14(c) wherein the values Qva(0), Qvf(0), Bv(0), Ava(0) and Avf(0) are the measured value or the calculated value. It is noted that Qva(0)=Q'va, Qvf=Q'vf, Bv(0)=B'v. Remainders are stored value in the memory and calculated value using the stored value.

The register REG 4 is used as an address register for RAM. 0 is set in the register REG4 in the step #30 thereby obtaining the desired aperture value Ava(0) of the ambient light alone, the desired aperture value Avf(0) of the flash light alone and the desired aperture value Avt(0) for the total light in the steps #31 through #36 then advancing to the step #37. The value $\log_2(2^{d2}+1)$ can be obtained by reading the logarithmic table in RAM in the step #35. In the step #37, it is judged whether or not the content of the register REG4 coincides with the number MN of the memory for detecting whether or not the conversion of the measured light value and stored value into the displaying data is completed. In case of not coincided, the program flow advances to the step #38 for increment of 1 in the register REG4, then returning to the step #31 to repeat the steps #31 through #37. In case of coincidence, the program flow advances to the step #39. Assuming that operation of the memory clear key has been detected in the step #3, the number MN of the memory has been set by 0, therefore coincidence occurs at the first judgement in the step #37, the program flow advances to the step #39-1.without shifting to the step #38.

In the step #39-1, 0 (zero) representing the number of the light measurement data is set in the register REG0. It is noted that in the light measurement routine, 0 (zero) is set in the register REG0 through the explanation made hereinafter. In the step #39-2, the state of the normal display/separate display switch SW8 is judged. CPU 100 produces a "low" signal only on the key strobe terminal ST1, thereby detecting which of the normal display or separate display is selected by the "high" or "low" state of the key input terminal I2. In a case where the key input terminal I2 is "low", the program flow advances to the step #40 for the normal display. In a case where the key input terminal I2 is "high", the program flow advances to the step #45 for the separate display. In the former case, the flag SPF is set by 0 in the step #41 for storing the fact that the normal display is selected. Thereafter, the desired aperture value Avt (MN) wherein MN is 0 through 10 is replaced for the total light value an is replaced by the relative value SP (MN) for the measured value Avt(0). This operation is repeated by the number of the memory through through #44. Then the program flow advances the steps #41 to the data decoding routine of the program steps beginning from #48 for converting the displaying data into the data corresponding to the segments of the LCD display unit 2.

In the latter case i.e., in case of the separate display, the program flow advances to the steps #45 through #47. In the step #45, the flag SPF is set by 1 for indicating the separate display. Assuming that the content of the register REG0 is 0, SP(1) in the step #46 is the relative value corresponding to the desired aperture value Avf(0) for the flash light against the desired aperture value Avt(0) corresponding to the total measured light value. SP(2) in the step #47 is the relative value corresponding to the desired aperture value Ava(0) for the ambient light against the desired aperture value Avt(0) corresponding to the total measured light value.

In the step #48 for judging the kind of the keys, the state of the switch SW7 of the absolute scale display/relative scale display key 12 is judged. CPU 100 produces a "low" level signal at the key strobe terminal ST1 alone and judges which of the absolute scale display or the relative scale display is set by the switch SW7 by watching the state "low" or "high" of the key input terminal I3. In a case where the input terminal is "low" for the relative scale display, the program flow advances to the step #49. In case of absolute scale display, the state of the key input terminal I3 is "high", so that the program flow advances to the step #66. In the former case, analog display segment data (00 ... 1 ... 00)$_B$ is stored in the registers REG1 and REG2. Each of the bits of the registers REG1 and REG2 corresponds to each of the segments of the LCD display unit 2a. The bit existing at the center between MSB (most significant bit) and LSB (least significant bit) corresponds to the display segment situated at the center of the LCD display unit 2a and further corresponding to the bit at which "1" in the segment data (00 ... 1 ... 00)$_B$ is put. The register REG2 serves to store the display segment data held in the latch 203. The contents of the registers REG1 and REG2 coincide with each other in the case of the absolute scale display, but in case of a separate display, different values of 0 and 1 are stored in the respective bits for storing the desired aperture value for the flash light. By advancing to the step #50, the flag SPF is judged for detecting which of the normal display and the separate display is selected. In case of 1 of the flag SPF, the program flow advances to the step #51 for the relative scale separated display routine and in case of 0 of the flag SPF, the program flow advances to the step 60 for the relative scale normal display routine.

The relative scale separate display displays the desired aperture value for the total light at the center of the scale in a dot and the desired aperture values for the ambient light and the flash light are respectively displayed at the relative positions displaced from the center dot. In order to recognizing the desired aperture values for the flash light and the ambient light, the dot representing the ambient light is turned on constantly and the dot representing the flash light is repeatedly turned on and off with a frequency of 2 Hz.

The steps #51 through 59 are the converting routine for the relative scale separate display. In the step #51, the value SP(1) which is the relative desired aperture values between the total light and the flash light obtained in the step #46 is converted into the data SP(1) decode I and then storing in the working register REG3 for display.

Figure 14E:
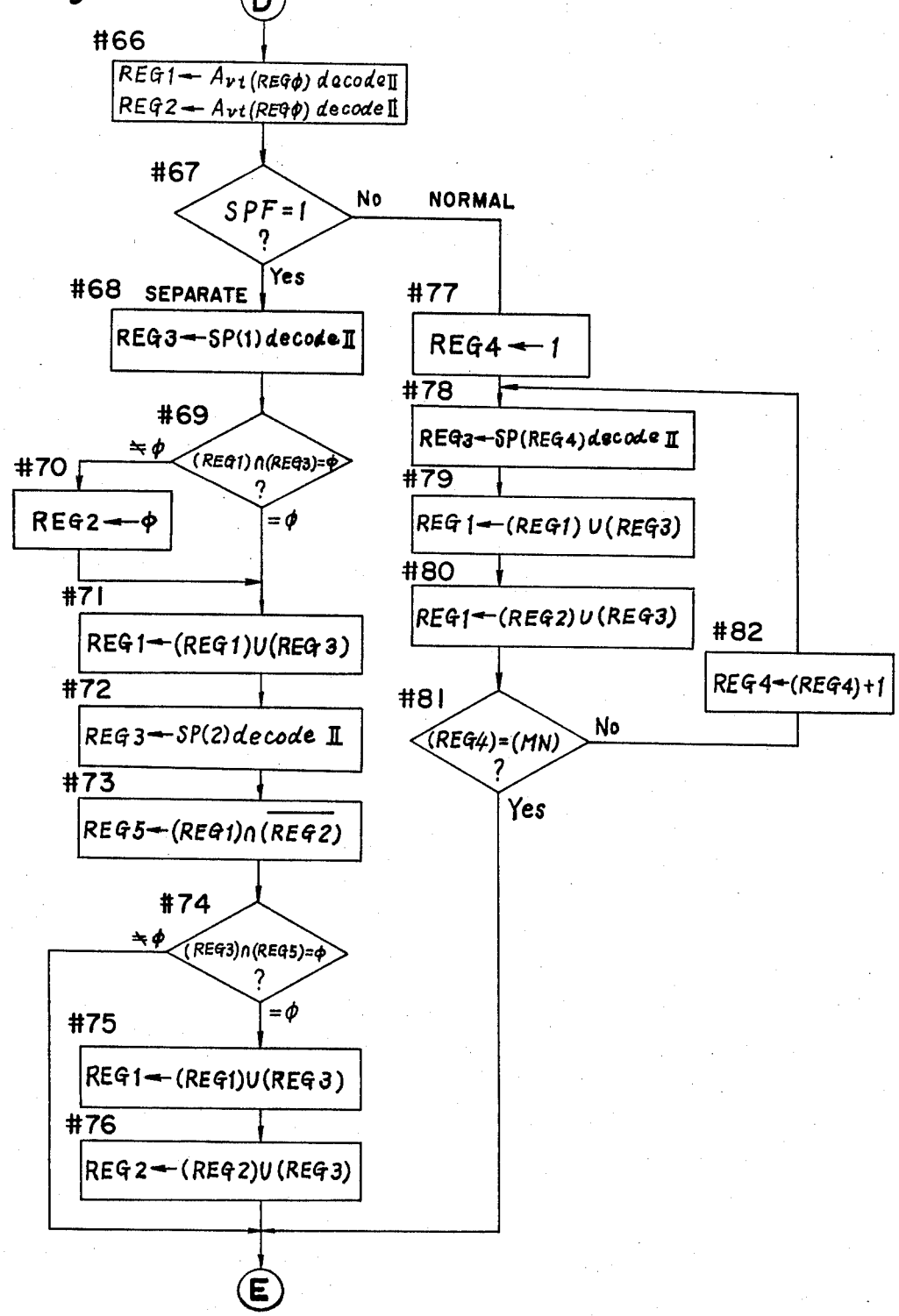
Figure 14F:
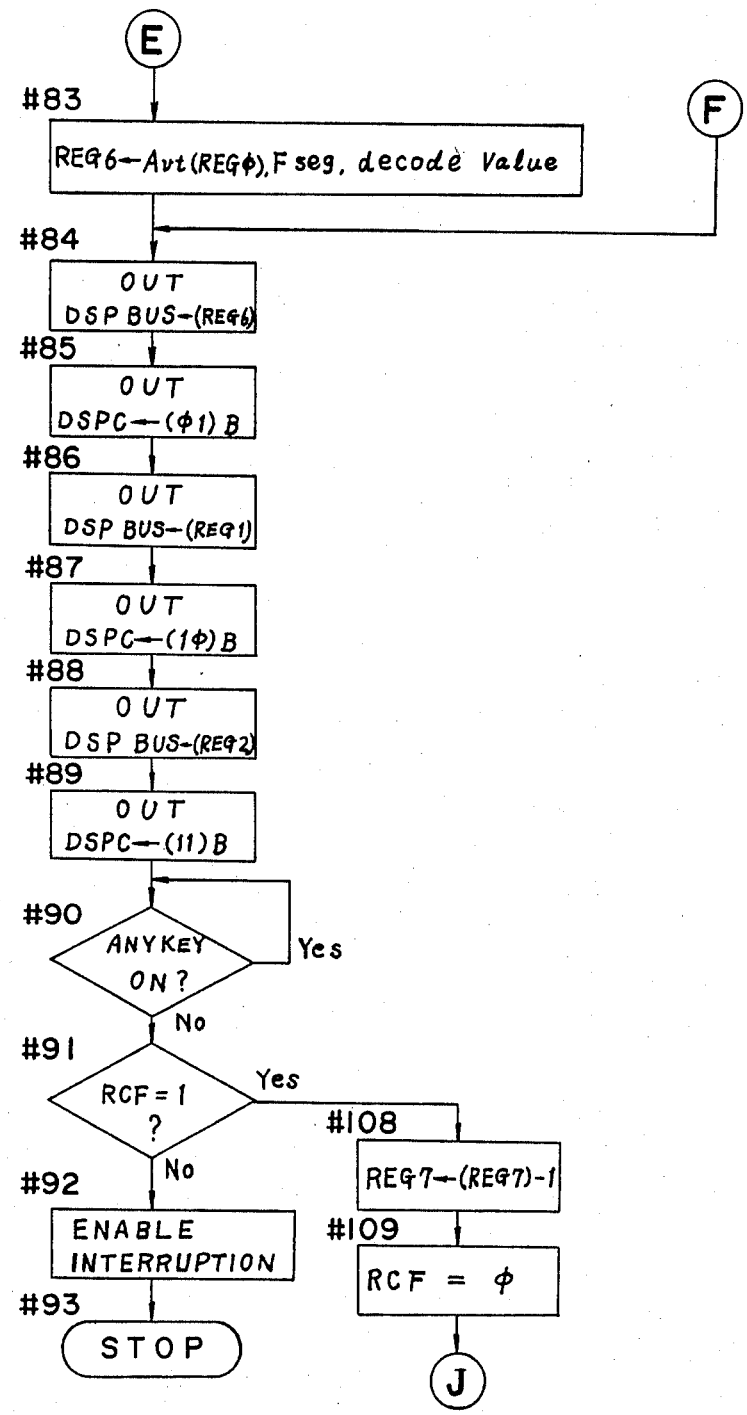
Figure 14G:
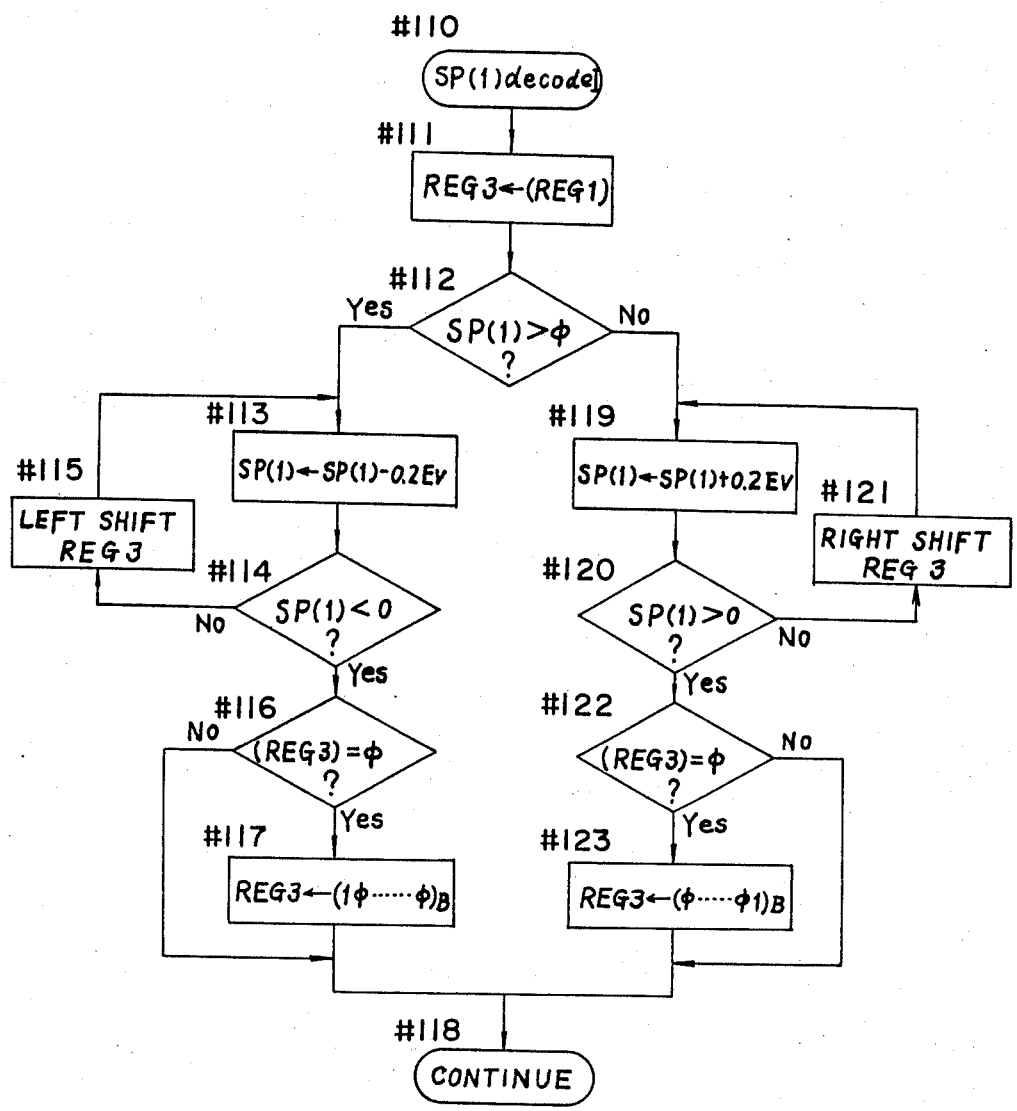
Figure 14:
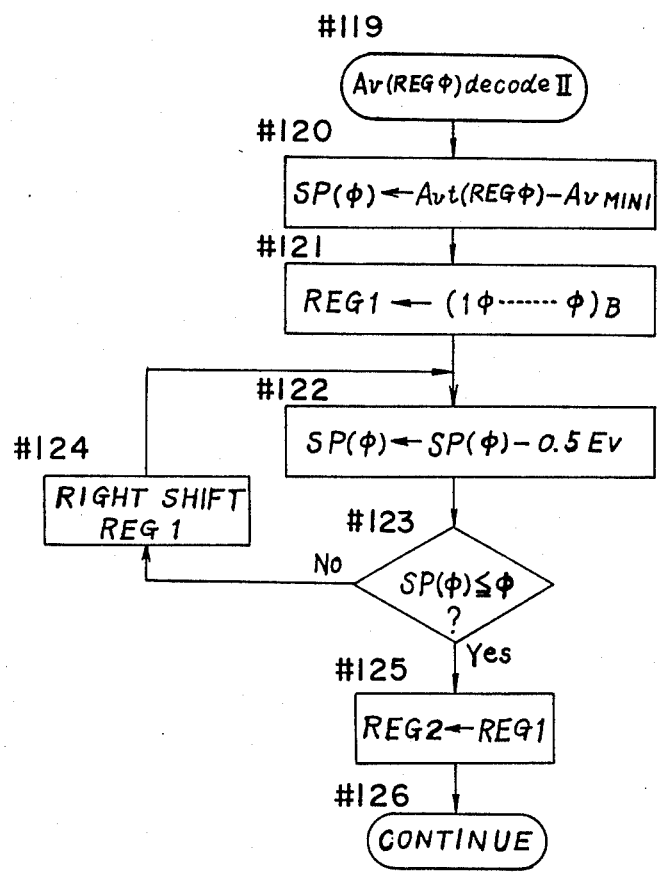

The detail of the step #51 is shown in FIG. 14(g), wherein the content of the display register REG1 is transferred to the working register REG3 in the step #111. Then the plus or minus of the value SP(1) stored in the register REG0 is detected in the step #112. In a case where the value SP(1) is plus, the program flow advances to the steps #113 through #115 for shifting the content of the working register REG3 in the left direction (towards the MSB) while in a case where the value SP(1) is not plus, the program flow is advanced to the steps #119 through #121 for shifting the content of the working register in the right direction (towards the LSB). In case of the former, in the step #113, the relative value SP(1) is decreased by the minimum classifying value 0.2 Ev of the display, then advances to the step #114 for detecting the plus or minus of the relative value SP(1). In case of plus, the program flow advances to the step #115 for shifting the content of the working register REG3 in the left direction in the bit basis, returning to the step #113. In shifting the content, $(0)_B$ is set in the LSD bit. In case of minus, the program flow advances to a over scale process routine shown by the step #116. Accordingly, when the program flow is passed the step #115 N times, the working register REG3 stores "1" at the bit position moved left by N bits from the initial bit position where the "1" is initially stored at the step #113.

In the step #116, overflow of the content in the register REG3 due to the left shift is detected, by watching whether the content of the working register is 0 which occurs when the overflow occurs. Upon occurrence of an overflow, the program flow advances to the step #117 wherein "1" is set in the MSB of the wording register REG3 so that a leftmost dot is displayed in the display unit 2a for indicating over-range. In a case where the overflow is absent, the program flow advances to the step #118 to finish this routine.

If the relative value SP(1) is not plus, the program flow advances to the steps #119 through #121, wherein the relative value SP(1) is added by the minimum resolution value of 0.2 Ev once or more till the sum thereof becomes a plus value and the content of the working register REG3 is shifted rightward bit by bit every time the minimum resolution value 0.2 Ev is added. Overflow in the register REG3 due to the right shift mentioned above is detected in the steps #122 and #123 by detecting that the content of the working register REG3 becomes 0. When overflow occurs, the LSB of the working register REG3 is set by "1" and the program flow goes to the end of this routine, while overflow does not occur, the program flow goes to the end of this routine directly.

In the subsequent operation shown in FIG. 14(d), a logic product between the content of the register REG1 in which "1" is set at the center bit position of the register and the content of the working register REG3 is calculated and it is detected whether or not the result of the logic product is 0. In a case where the result of the logic product is not 0, which represents that as the desired aperture value for the total light value is equal to the desired aperture value for the flash light, the mark representing the desired aperture for the flash light is to be overlapped with the central mark, the program flow advances to the step #53 wherein 0 is set at the central bit position of the register REG2 so as repeatedly to turn the central mark of the display unit 2a to turn on and off.

In a case where the result of the logic product is 0, since the mark of the desired aperture value for the total light does not overlap with the desired aperture value of the flash light, the program flow advances to the step #54 directly. In the step #54, a logic sum is calculated between the contents of both of the registers REG1 and REG3 and the result of the logic sum is stored in the register REG1. By this operation, the register REG1 serves to store either the signal representing the central mark of the display unit 2a for the aperture value of the total light in the central bit position of the register and the data $(1)_B$ in the bit position representing the desired aperture value for the flash light on the display unit 2a.

The relative value SP(2) between the desired aperture value obtained in the step #47 and the desired aperture value for the total light value is converted into the segment data SP(2).decodeI in the step #55, thus the segment data SP(2).decodeI is stored in the register REG3. The conversion of the relative value SP(2) to the segment data SP(2).decode I is similar to those of the SP(1), the detailed explanation of the conversion is herein omitted.

In the subsequent step #56, a logic product is calculated between the content of the register REG1 and the complemental value of the content of the register REG2, the result is stored in the register REG5. As the result, the data $(1)_B$ is stored only in the bit position of the register REG5 for displaying the desired aperture value for the flash light. Subsequently the program flow advances to the step #57 wherein it is judged whether or not a logic product between the content stored in the register REG5 and the decoded data SP(2).Decode I stored in the working register REG3 (representing the desired aperture value for the ambient light) is 0. This operation is made to judge whether or not the two marks are overlappingly displayed due to the fact that the desired aperture value for the ambient light is equal to the desired aperture value for the flash light. In case of 0 of the logic product, since both of the desired aperture values do not overlap, the program flow advances to the steps #58 and #59, causing the data obtained by the logic sum between the content of the display register REG1 and the content of the working register REG3 to be stored in the register REG1 in the step #58 and a logic sum between the content of the display register REG2 and the content of the working register REG3 to be stored in the display register REG2. Through this operation, there are stored three data of $(1)_B$ at any of three bit positions of the display register REG1 corresponding to the respective aperture values for the total light, flash light and the ambient light or two data of $(1)_B$ at any two bit positions of the display register REG1 in either of the cases where the desired aperture value for the total light is equal to the desired aperture value for the ambient light or where the desired aperture value for the total light is equal to the desired aperture value for the flash light. It is noted that there never occurs such a case where all three desired aperture values coincide with each other. On the other hand, the register REG2 has the datum $(0)_B$ stored in its bit position corresponding to the bit position of the display register REG1 on which the datum $(1)_B$ of the desired aperture value for the flash light is stored. If the result of the logic product mentioned above is not 0, any of two marks may be overlapped. Under such state, there never occurs overlapping of the three marks of the respective desired aperture values for the total light, flash light and the ambient light, accordingly, it is sufficient to set $(1)_B$ at the central bit position of the register REG2 which represents the desired aperture value for the total light different from the contents stored in the display register REG1 for displaying the marks of the respective desired aperture values for the total light and the flash light. Accordingly, in the case where the logic product is not 0, it is not necessary to modify the content of the registers REG1 and REG2. whereby the program flow advances to the display routine after the step #83.

In case of "1" of the flag SPF, the program flow advances to the data conversion routine for the relative scale normal display including the steps #60 through #65. The working register REG4 acts to store the serial number of the stored data in the memory. In the step #60, "1" is set in the working register REG4. Subsequently the display data SP(REG4)decodeI which is the decoded data of the relative value of the desired aperture value for the total light corresponding to the serial number of the register REG4 is transferred to the register REG3 in the step #61. Then the program flow advances to the step #62, wherein a logic sum between the content of the display data SP(REG4)decodeI in the register REG3 and the content of the display register REGI is calculated and the result of which is stored in the register REG1. In the step #63, a logic sum between the content of the register REG3 and the content of the display register REG2 is calculated. and stored in the register REG2. In this manner, "1" is placed in each bit position of the registers REG1 and REG2 indicated by the register REG4. In the step #64, the content of the register MN which is the number of the stored values and the content of the register REG4 are compared so as to detect whether or not all of the stored values are processed in the steps #61 through #63. In a case where the content of the register REG4 does not reach the content of the register MN, the program flow advances to the step #65, wherein 1 is added to the content of the register REG4, repeating the steps #61 through #64. Upon reaching the content of the register REG4 the number stored in the register MN, it is detected that all the stored values are already displayed and therefore, the program flow advances to the display routine comprised of the steps after #83.

In a case where the key input terminal I3 is low, i.e., the absolute scale display/relative scale display key 12 is set to the absolute scale display side, the program flow advances from the step #48 to the step #66 wherein the data Avt(REG0)decodeII is transferred to the registers REG1 and REG2. The data Avt(REG0)decodeII is the value converted from the desired aperture value for the total light obtained in the step #36 for the analog display segments on the display unit 2a. The amount of the data Avt(REG0)decodeII is represented by placing 1 at the bit position of the register REG1 which corresponds to the scale postion of the display unit 2a indicated by the desired aperture value Avt-(REG0) for the total light. The the other bit positions of the register REG1 are placed by 0.

FIG. 14(h) depicts the process for converting the desired aperture value for the total light into the display data suitable for driving the respective segments of the analog display unit 2a. In the step #120, the content Avt(REG0) stored in the register REG0 representing the desired aperture value for the total light is subtracted by the minimum aperture value displayable in the analog display unit 2a and the difference SP(0) is obtained. In the step #121, 1 is set in the MSB of the analog display register REG1 which corresponds to the minimum value of the analog display unit 2a with the remainder set by 0. Thus the content of the register REG1 is represented as $(10000 \ldots 0)_B$. By the steps #122 through #124, the content of the register REG1 is subtracted by the minimum resolution value 0.5 Ev and every time this subtraction is made the content of the register REG1 is shifted rightward directed to the MSB position and when the value SP(0) becomes 0 or less, the program flow advances to the next step #125. In the step #125, the content of the register REG1 is transferred to the register REG2. Thus, the respective registers REG1 and REG2 store the value Avt(REG0-)decodeII converted from the desired aperture value Avt(REG0) into the suitable form for driving the respective segments of the analog display unit 2a.

It is noted that in the process as described above, an analog scale over process is omitted since the same is not directly related to the present invention. It is further noted that explanation is made hereinafter as such analog scale over does not occur.

Referring to FIG. 14(e), in the step #67, flag SPF is judged for detecting which of the normal display or separate display is set and in case of the separate display, flag SPF is 1 whereby the program flow advances to the steps #68 through #76 for the data processing of the separate display, while in case of the normal display, flag SPF is 0, whereby the program flow advances to the steps #77 through #82 for the data processing of the normal display. Since the process made in the steps #67 through #82 is similar to the process performed in the steps #50 through #65 for the displaying data process of the relative scale display, explanation of the detail of each step is herein omitted. The term SP(1)decodeII used in the step #68 represents the data for driving the respective segments of the display unit 2a for displaying the desired aperture value of the flash light obtained from the relative value SP(1) between the desired aperture value Avt for the total light and the desired aperture value Avf for the flash light. By the data SP(1)decodeII, "1" is put at the bit position of the register REG3 corresponding to the scale position on the analog display unit 2a for displaying absolute value of the desired aperture value for the flash light. The steps #69 through #71 are the process for processing the data when the mark of the desired aperture value for the total light overlaps with the mark of the desired aperture value for the flash light. The term SP(2)decodeII used in the step #72 represents the data for driving the respective segments of the display unit 2a for displaying the desired aperture value for the ambient light obtained from the relative value SP(2) between the desired aperture value Avt for the total light and the desired aperture value Ava for the ambient light. By the data SP(2)decodeII, "1" is put at the bit position of the register REG3 corresponding to the scale position on the analog display unit 2a for displaying absolute value of the desired aperture value for the ambient light. The steps #74 through #76 are the process for processing the data when the mark of the desired aperture value for the ambient light overlaps with the mark of the desired aperture value for the flash light.

In the steps #77 through #82, the respective data stored in the memory are converted into the data for the display unit 2a.

The term SP(REG4)decodeII represents the segment data for the display unit 2a obtained by the relative value SP(REG4) between the stored value Avt(REG4) of the register REG4 and the measured value Avt(0). When the steps #68 through #76 representing the separate display routine or the steps #77 through #82 representing the normal display routine are completed, the program flow advances to the displaying data output routine from the step #83 shown in FIG. 14(f). In the step #83, segment coded data converted from the desired aperture value Avt for the total light into the segment data of F value basis is stored in the display register REG6, then the program flow advances to the routine beginning from the step #84 for outputting the data for driving the LCD driver 200.

In the step #84, the data stored in the register REG6 is transferred to the latches 201 through 203 of the LCD driver 200 from the output port DSP of CPU100 through the data bus DB1, then the program flow advances to the step #85 wherein the display control output $(01)_B$ is output from the output port DSPC, sending clock pulses to the latch 201 so as to read the content of the latch 201 to thereby convert the output of the latch 201 into the display data in digital form. Similarly in the steps #86 and #87, the output of the latch 202 is converted to the display data for the analog display unit 2a and in the steps #88 and #89, the output of the latch 203 is converted to the display data for the analog display unit 2a. In the step #90, it is judged whether or not any one of the keys 4,5,6 or 7 is operated by detecting whether or not the state of the key input terminals I2 and I3 is 0. If no key is operated, the state of the key input terminals I2 and I3 is $(1,1)_B$, the program flow advances to the step #92. If any one of the keys 4 through 7 is kept operated and the state of the key input terminals I2 and I3 is not $(1,1)_B$, the step #90 is repeated until the operation of the key is released. This repetition of the step #90 is made so as to display the data stored in the memory only during the operation of the memory recall key 6 in the memory recall routine. The repetition of the step #90 is also effective to prevent several times of key processing in one time of the key operation. If no key is operated, the program flow advances to the step #91 to judge the state of the memory process flag RCF. The memory process flag RCF is set to 0 when any one of the keys 4,5, and 7 except for the memory recall key 6 is operated. If the flag RCF is 0, since the LCDs 601 and 602 display the last measurement data, then the program flow advances to the step #92 for allowing the interruption and in turn advances to the step #93 causing the CPU100 to wait for interruption.

Referring to again FIG. 14(a), in a case where the memory key is operated, the program flow advances to the step #26 from #3, wherein it is judged whether the number of the data to be stored in the memory exceeds the maximum number of the memory areas. The number of the data already stored is held in the register MN. Assuming that the maximum number of the memory area is 10, if there are already ten $(10)_D$ stored data, wherein $(\ )_D$ means decimal number, in the step #26-1, error message data representing the fact that the number of the data to be stored exceeds the maximum number of the memory area is stored in the register REG6, the program flow advances to the display routine beginning from the step #84. If the number of the data to be stored is smaller than the maximum number 10 of the memory area, the program flow advances to the step #27 wherein 1 is added to the number held in the register MN and in the steps #28 and #29, the measured data Q'vf and Bv are stored in the memory area of RAM Qv(MN) and RAM Bv (MN) of the address corresponding to the content of the register MN respectively. The program flow advances to the step #30 for displaying the measured light data and stored data.

In a case where the memory clear key 7 is operated, the program flow advances to the step #25, resetting the register MN to 0, and advancing to the step #30. In this case if the normal display is selected, (REG4)=(MN) is established in the steps #42, #64 and #81 in the first time of the execution of the respective routines described before, therefore, only the measured data is displayed.

In a case where the memory recall key 6 is operated, the program flow advances to the step #103, wherein 1 is set in the flag RCF representing that the memory recall process is being executed. The serial number of the data to be displayed is stored in the register REG7.

If there is more than one data in the memory, the register REG7 stores any one of the number 1 the number MN held in the register MN.

If there is no data in the memory, the content of the register REG7 is 0, whereby the last measured data is displayed. In this case the content of the display is kept unchanged.

The content of the register REG7 is increased by 1 every time the recall key process is executed, and stores the serial number of the data which is to be displayed in the subsequent memory recall process.

In the step #104 it is judged whether the content of the register REG7 is 0. With the content 0, the program flow advances to the step #105 so that the maximum serial number of the stored data i.e., the number of the stored data MN is put in the register REG7, then the program advances to the step #106. If there is no stored data, 0 is put in the register REG7 again. If the content of the register REG7 is not 0, the program flow advances to the step #106 directly, wherein the content of the register REG7 is transferred to the register REG0 of storing the serial number of each of the data to be displayed. In the step #107, judgement to the selection of the normal display or separate display is made by the signal of the normal/separation selection key 13. In case of the normal display, the program flow advances to the step #83, wherein the content of the register REG6 is replaced by the decoded F value data decoded into the suitable form for driving the segments of the display unit 3. The F value used here is Avt(REG0) addressed by the content of the register REG0. Thereafter, the program flow advances to the steps #84 through #87 for the display data output process. In case of the normal display, the content displayed in the analog display unit 2a or LCD 602 is kept unchanged, while the content displayed in the digital display unit 3 or the digital LCD 601 is changed by the data converted into the F value from the memory value Avt(REG0) addreseed by the content of the register REG0. In a case where no data is stored, only the measured value is displayed and the content of the display on the display units 2a and 3 is unchanged.

In case of the separate display, the program flow advances to the steps #45 through #59 and #83 through #89, whereby F value converted from the stored value corresponding to the address indicated by the content of the register REG0 is displayed on both of the display units 2a and 3. If no data is stored, since the content of the register REG0 is 0, only the measured value is displayed and the content of the display is unchanged. In the step #90, it is detected that any one of the keys is released from the operated state. By this operation, while the memory recall key 6 is operated, the display units 2a and 3 continuously display the data recalled. When the memory recall key is released, the program flow advances to the step #91 so as to return the process toward the measured data display routine. In the step #91, the flag RCF is judged for detecting whether the last process just before is the memory recall process. In a case where the program flow reaches the step #91 from the memory recall key process routine, the flag RCF holds 1, the program flow advances to the step #108, wherein the serial number (REG7−1) of the data to be displayed at the subsequent operation of the memory recall key is stored in the register REG7. In the step #109, the flag RCF is reset to 0 for indication of finish of the memory recall and advancing to the step #39-1, wherein the content of the register REG0 is set by 0 and then advances to the steps #39-2 through #90 so as to return the display of the display units 2a and 3 for displaying the measured data. After this step, the program flow advances to the steps #92 and #93 since the flag RCF is 0 to stop the program to wait for the subsequent interruption.

When the setting of any one of the exposure time set dial 9, film sensitivity set dial 10 or ratio set dial 11 is changed, the interruption instruction is input in the interruption terminal INT2 of CPU 100, whereby the interruption flag is set. If the CPU 100 is in the wait state, the program flow advances directly to the set data changing routine from the step #95, on the contrary, if CPU 100 is working for any process, the interruption flag is checked after the word is finished and then the program flow advances to the set data changing routine from the step #95. The step #96 inhibit further interruption so as to assure to continue the present processing. In the steps #97 through #102, the data changed is read in. Thereafter, the program flow advances to the step #30 of the measurement start key process routine. In the steps #30 through #38, in order to obtain the measured data after the change of the set data, calculation is made on the basis of the changed data, then the program flow advances to the steps #39-1 through #83 for converting the measured data into the display data, the steps #84 through 89 for outputting the display data, the step #90 for waiting for the off state of any of the keys, the step #91 for judging the state of the flag and the step #92 for waiting for the subsequent interruption.

One example of the data processing of the steps #49 through #59 for processing the data when there may occur the overlapping of the two marks in the relative scale separate display will be shown hereinafter. For the sake of brevity, it is assumed that the number of the bits of one marks to be displayed is 5 with the interval of minimum resolution to be 0.5 Ev. It is noted that the symbol x means a logic product, + means a logic sum and * is a complemental data.

EXAMPLE 1

In a case where SP(1) is smaller than 0.5 Ev. (the desired aperture value for the total light is substantially equal to the desired aperture value for the flash light)

| step | #49 | REG1=(00100) |
|---|---|---|
| ↓ | | REG2=(00100) |
| | #51 | REG3--SP(1)decodeI |
| ↓ | | =(00100) |
| | #52 | (REG1)×(REG3) |
| ↓ | | =(00100)×(00100) |
| ↓ | | =(00100); (not 0) |
| | #53 | REG2--(00000) |
| ↓ | | |
| | #54 | REG1--(REG1)+((REG3) |
| ↓ | | =(00100)+(00100) |
| ↓ | | =(00100) |
| | #55 | REG3--SP(2)decodeI |
| ↓ | | =(10000) |
| | #56 | REG5--(REG1)×(REG2*) |
| ↓ | | =(00100)×(11111) |
| ↓ | | =(00100) |
| | #57 | (REG3)×(REG5) |
| ↓ | | =(10000)×(00100) |
| ↓ | | =(00000) (=0) |
| | #58 | REG1--(REG1)+(REG3) |
| ↓ | | =(00100)+(10000) |
| ↓ | | =(10100) |
| | #59 | REG2--(REG2)+(REG3) |
| | | =(00000)+(10000) |
| | | =(10000) |

As the result of the process described above, the content of the register REG1 is (10100) and the content of the register REG2 is (10000), wherein the both first bits of the registers REG1 and REG2 represent the scale portion of the display unit 2a on which the mark of the desired aperture value for the ambient light is displayed and since the content of the first bit of the registers REG1 and REG2 is 1, the mark displayed on the display unit 2a is continuously turned on without flashing. The third bits of both the registers REG1 and REG3 represent the scale position of the display unit 2a on which the mark of the desired aperture value for the total light and the desired aperture value for the flash light are displayed in an overlapped manner and since the contents of both third bits of the registers REG1 and REG2 are respectively 1 and 0, therefore, the mark displayed on the display unit 2a is turned on and off.

EXAMPLE 2

In a case where SP(2) is smaller than 0.5 Ev (the desired aperture value for the total light and the desired aperture value for the ambient light are substantially equal)

| step | #49 | REG1=(00100) |
|---|---|---|
| ↓ | | REG2=(00100) |
| | #51 | REG3--SP(1)decodeI |
| ↓ | | =(10000) |
| | #52 | (REG1)×(REG3) |
| ↓ | | =(00100)×(10000) |
| ↓ | | =(00000) (=0) |
| | #54 | REG1--(REG1)+(REG3) |
| ↓ | | =(00100)+(10000) |
| ↓ | | =(10100) |
| | #55 | REG3--SP(2)decodeI |
| ↓ | | =(00100) |
| | #56 | REG5--(REG1)×(REG2*) |
| ↓ | | =(10100)×(11011) |
| ↓ | | =(10000) |
| | #57 | (REG3)×(REG5) |
| ↓ | | =(00100)×(10000) |
| ↓ | | =(00000) (=0) |
| | #58 | REG1--(REG1)+(REG3) |
| ↓ | | =(10100)+(00100) |
| ↓ | | =(10100) |
| | #59 | REG2--(REG2)+(REG3) |
| | | =(00100)+(00100) |
| | | =(00100) |

As the result of the operation, the content of the register REG1 is (10100) and the content of the register REG2 is (00100), wherein the both first bits of both the registers REG1 and REG2 represent the scale position of the display unit 2a on which the mark of the desired aperture value for the flash light is displayed and since the content of the first bit of the register REG1 is 1 and content of the first bit of the register REG2 is 0, the mark displayed on the display unit 2a is turned on and off. The both third bits of both the registers REG1 and REG3 represent the scale position of the display unit 2a on which the mark of the desired aperture value for the total light and the mark of the desired aperture value for the ambient light are displayed in an overlapped manner and since the contents of the third bits of both the registers REG1 and REG2 are respectively 1, therefore, the mark displayed on the display unit 2a is continuously turned on.

EXAMPLE 3

In a case where SP(1) is not equal to SP(2) (the desired aperture value for the flash light is substantially equal to the desired aperture value for the ambient light)

| step | |
|---|---|
| #49 | REG1=(00100) |
| ↓ | REG2=(00100) |
| #51 | REG3--SP(1)decodeI |
| | =(01000) |
| ↓ | |
| #52 | (REG1)×((REG3) |
| | (00100)×(01000) |
| | =(00000) (=0) |
| ↓ | |
| #54 | REG1--(REG1)+(REG3) |
| | =(00100)+(01000) |
| | =(01100) |
| ↓ | |
| #55 | REG3--SP(2)decodeII |
| | (01000) |
| ↓ | |
| #56 | REG5--(REG1)×(REG2*) |
| | =(01100)×(11011) |
| | =(01000) |
| ↓ | |
| #57 | (REG3)×(REG5) |
| | =(01000)×(01000) |
| | =(01000) (not0) |

As the result of the operation, the content of the register REG1 is (01100) and the content of the register REG2 is (00100), wherein the second bits of both the register REG1 and REG2 represent the scale position of the display unit 2a on which the mark of the desired aperture value for the flash light and the mark of the desired aperture value for the ambient light are displayed in an overlapped manner and since the content of the second bit of the register REG1 is 1 and content of the second bit of the register REG2 is 0, the mark displayed on the display unit 2a is turned on and off. The third bits of both the registers REG1 and REG3 represent the scale position of the display unit 2a on which the mark of the desired aperture value for the total light since the contents of the third bits of both the registers REG1 and REG2 are respectively 1, therefore, the mark displayed on the display unit 2a is continuously turned on.

Figure 15:
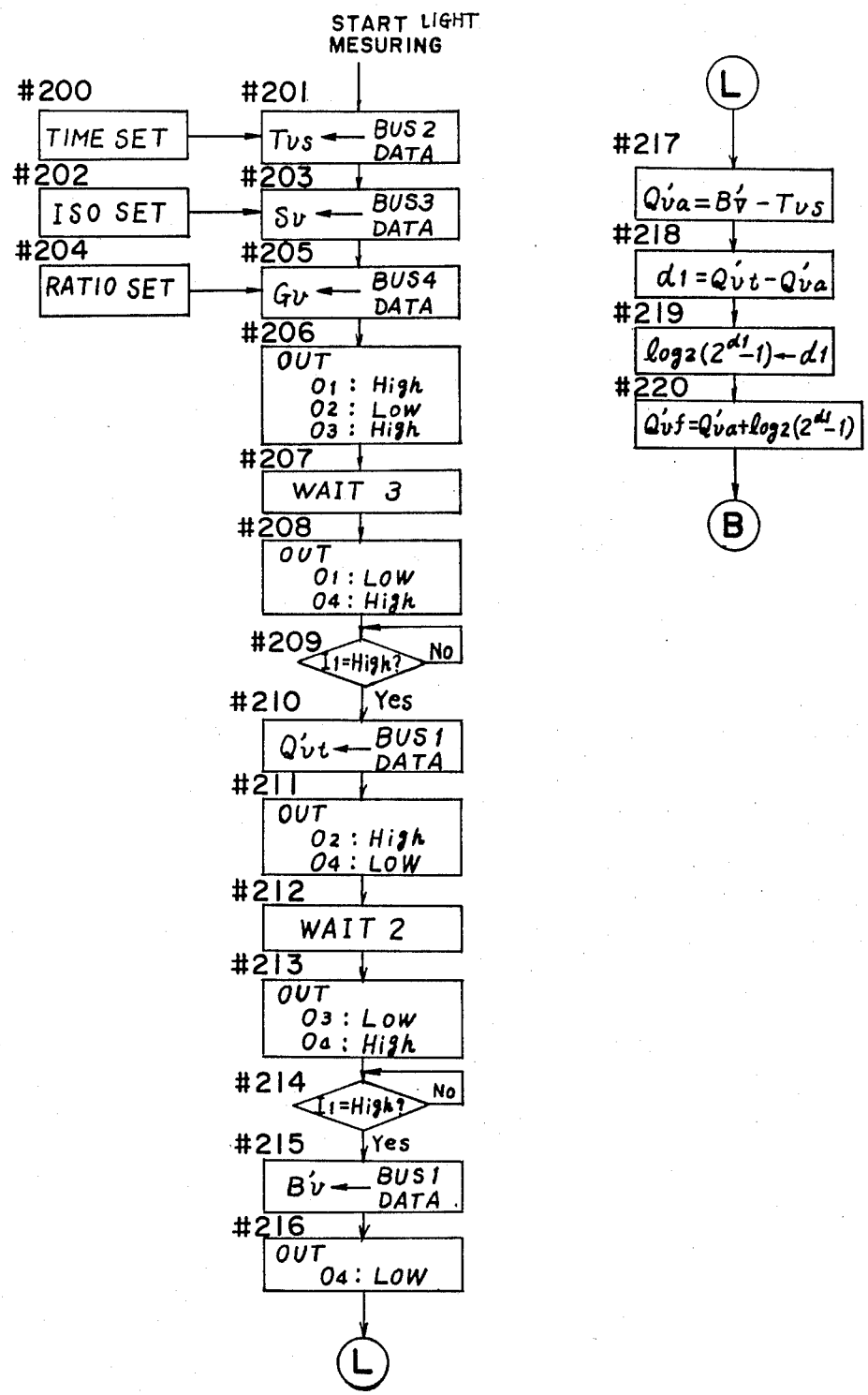
FIG. 15 is a flow chart showing an essential portion of the second embodiment of the light measuring device according to the present invention.

FIG. 15 is a flow chart of an essential portion of the second embodiment of the present invention. In the second embodiment, the step #4 shown in FIG. 14(a) through the step #24 shown in FIG. 14(b) are replaced by the steps #201 through #217 in FIG. 15. Upon judging the operation of the light measurement start key 4, CPU 100 reads in the set exposure time Tvs, film sensitivity Sv and the flash light ratio Gv. CPU 100 controls the output terminals 01 through 03 in the step #206 so as to start light measurement. The step #207 WAIT3 waits for the period of the set exposure time set in the step #200. Through this operation, the light measurement for the flash light is performed for a period of time equal to the set exposure time. The operation of the steps #208 through 216 is similar to those of #6 through #14 in the first embodiment described before, therefore, the detailed explanation thereof is herein omitted. The exposure time, film sensitivity and flash light ratio are set in the steps #201 through #205 with the steps #16 through #20 omitted. In a calculation routine formed by the steps #217 through #220, the ambient light value Q'va and flash light value Q'vf are separated from the logarithmic integrated flash light value Q'vt including the ambient light. Since the logarithmic integrated flash light value Q'vt is measured for the set exposure time, the ambient light value Q'va is calculated in the step #217 as the amount of the ambient light which may be obtained during the same time during which the flash light value is measured. The calculation performed in the steps after #213 is the same procedure of the steps #22 through #24 and therefore the detailed explanation thereof is herein omitted.

In the first embodiment, the flash light measuring time is the constant length of time $2^{-Tvc}$. The length of the constant time is set longer than the length of time from the start of illumination of the flash light to the end thereof. Under such a state, there may occur light measurement in a case where the shutter speed of a camera is set at such a high speed so that the shutter operation is completed while the flash light is still illuminated. On the other hand, according to the second embodiment, a correct light measurement can be expected even if the shutter speed is so high as the shutter operation is completed while the flash light is still illuminated.

Figure 16:
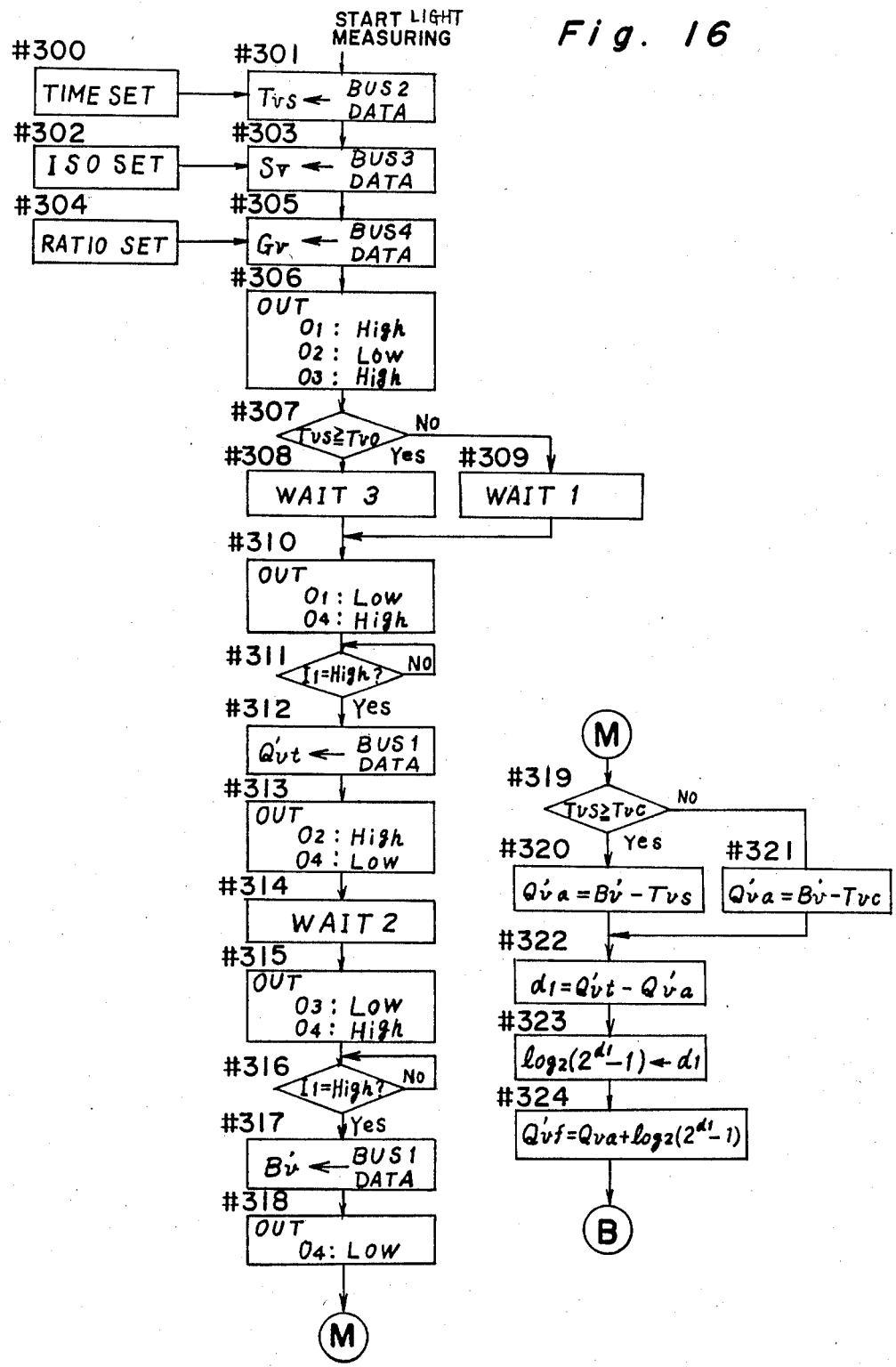
FIG. 16 is a flow chart showing an essential portion of the third embodiment of the light measuring device according to the present invention.

The third embodiment of the light measuring device according to the present invention is shown in FIG. 16 with respect to the flash light measurement and ambient light measurement.

In the third embodiment, in a case where the exposure time value is set shorter than the constant time value $2^{-Tvc}$, the flash light is measured in a real time basis according to the set time, while in a case where the exposure time value is set longer than the constant value $2^{-Tvc}$, the flash light is measured according to the constant value $2^{-Tvc}$. The third embodiment enables a rapid light measurement for the low shutter speed since it does not require unnecessary long time light measurement similar to the second embodiment without error of the light measurement in a case where the shutter speed is set so high that the shutter operation is completed while the flash light is still illuminated. In the steps #307 through #309, it is judged whether or not the set exposure time is higher than $2^{-Tvc}$, and if the set exposure time is higher than $2^{-Tvc}$, i.e., Tvs is larger or equal to Tvc, the set exposure time is lapsed in the step #308 of WAIT3, whereby the flash light is measured for the set exposure time. If the set exposure time is lower than $2^{-Tvc}$, i.e., Tvs is smaller than Tvc, the time corresponding to the value $2^{-Tvc}$ is lapsed by the step #309 of WAIT1, whereby the flash light is measured for the time of $2^{-Tvc}$. The amount of the ambient light Q'va for the time length equal to the time length during which the flash light was measured is calculated in the step #321.

Figure 17:
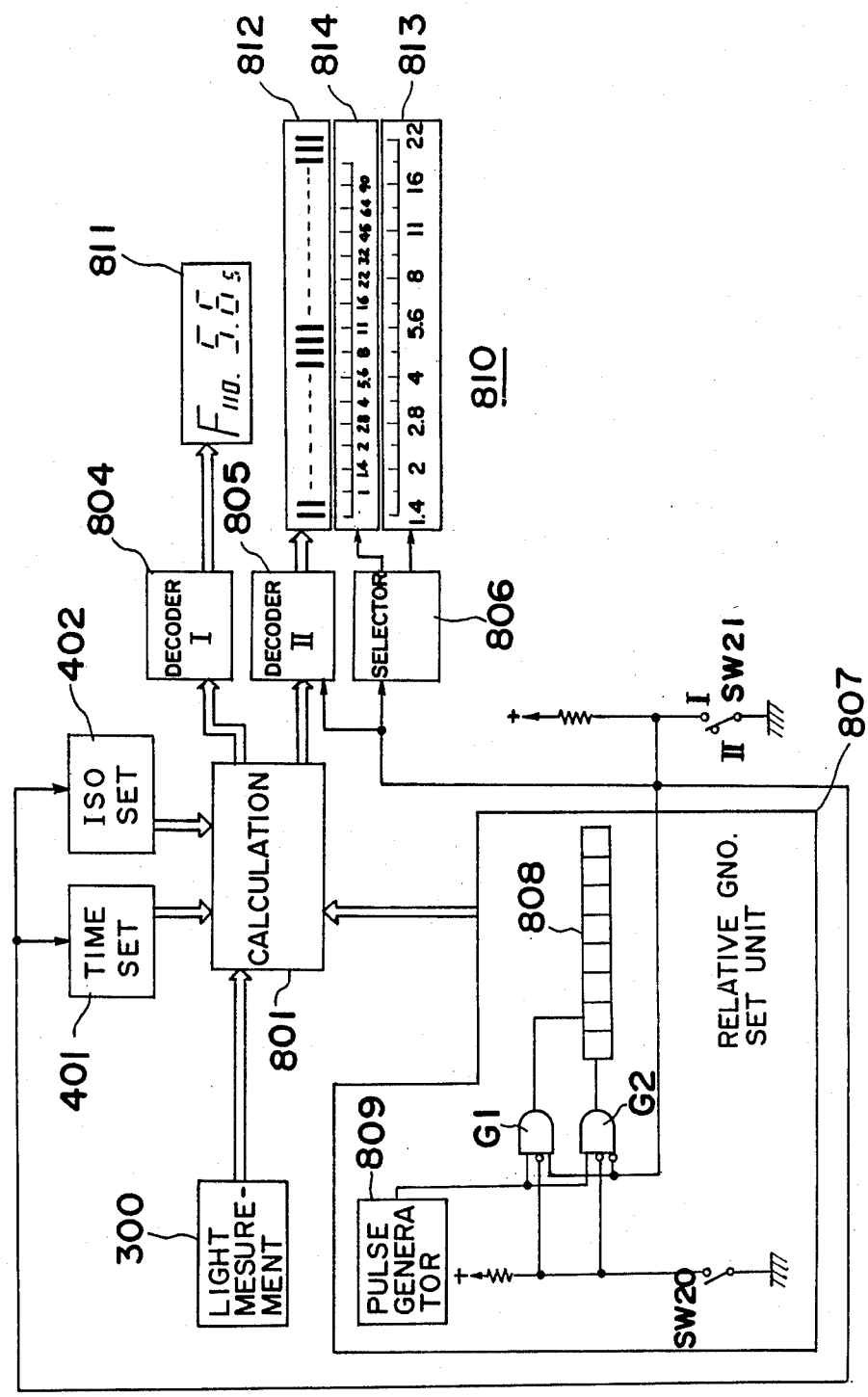
FIG. 17 is a schematic circuit diagram showing an essential portion of a further embodiment of the light measuring device according to the present invention.

Referring to FIG. 17 showing a further embodiment of the light measuring device according to the present invention, in which the light measurement circuit 300, the calculation circuit 801, the time set unit 401, ISO set unit 402, a relative guide number (referred to as G NO. hereinafter) set unit 807 and decoders 804 and 805 deal digital signals of 8 bits representing the exposure information. Specifically, the relative G NO. set unit 807 comprises a pulse counter 808 of 8 bits for storing set informations of the guide number, a pulse generator 809, a G NO. set switch SW20 which is closed upon operation of the G NO. set unit, gates G1 and G2 which are enabled upon closure of the G NO. set switch SW20 for feeding the pulses from the pulse generator 409 into the counter 408 and a fineness selection switch SW21 which acts to select the gates G1 and G2. The gate G1 is disabled or made non conductive and the gate G2 is enabled or made conductive when the fineness selection switch SW21 is opened on the other hand, the gate G1 is enabled and the gate G2 is disabled when the fineness selection switch SW21 is closed. The output terminal of the gate G1 is connected with the least significant bit or the lowest bit of the counter 808 and the output of the gate G2 is connected with the second least significant bit or the second lowest bit of the counter 808 so that when the pulses are supplied to the counter 808 through the gate G2, the content of the counter 808 i.e., the value of G NO. can be increased by twice of the value of G NO. set when the pulses are supplied to the counter 808 through the gate G1. Namely, when the pulses are supplied to the counter 808 through the gate G1, the content of the counter 808 is increased as 1, 2, 3, 4 . . . every time one pulse is supplied, on the other hand when the pulses are supplied to the counter 808 through the gate G2, the content of the counter 808 is increased as 2, 4, 6, 8 . . . . Thus, by switching over the fineness selection switch SW21, the interval or the rate of the change of the content of the counter 808 i.e., the set G NO. can be changed. In the G NO. set device as described above, in a case where an operator wishes to set the G NO. rapidly and even roughly by such as ½ Ev, the switch SW21 is opened with the switch SW20 operated so as to supply the pulses to second lowest bit of the counter 808 from the pulse generator 809 through the gate G2, on the contrary, in a case where the operator wishes to set the G NO. precisely by ¼ Ev, the switch SW21 is closed with the switch SW20 operated so as to supply the pulses to the lowest bit of the counter 808 through the gate G1.

A display device 810 comprises a digital display unit 811 in which the aperture value is displayed by 1 Ev unit with a fraction by 1/10 Ev unit displayed in the digital form and an analog display unit including a dot display unit 812, a first scale display unit 813 and a second scale display unit 814. Each of the first and second scale display units 813 and 814 is provided with a scale for displaying the aperture value and the width of the graduation for 1 Ev in the second scale display unit 814 is a half of the graduation for 1 Ev in the first scale display unit 813. The second scale display unit 814 can cover the wider range of the aperture value than the range displayed on the first scale display unit 813. When the fineness selecting switch SW21 is closed, the selector 806 enables the first scale display unit 413 and the decoder 805 enables the dot display unit 812 to display one of the dots corresponding to the aperture value which is to be displayed on the first scale display unit 813. On the contrary, when the fineness selecting switch SW21 is opened, the selector 806 enables the second scale display unit 814 and the decoder 805 enables the dot display unit 812 to display one of the dots which corresponding to the aperture value which is to be displayed on the second scale display unit 814.

The display device as described above is effective to display the aperture value either over a wide range using the second scale display unit 814 or by a precise value using the first scale display unit 813. In particular when the fineness of the set value is precise, the change of the set value can be clearly monitored on the analog scale even if the setting of the value is made with a fine scale interval.

The time set unit 401 and ISO set unit 402 are respectively arranged in a similar manner as the G NO. set 807 unit as described above, and the output of the fineness selecting switch SW21 is input in the both units 401 and 402.

What is claimed is:

1. A light measuring device for use in flash photography and capable of measuring both preliminary flash light and ambient light to obtain camera exposure information under a mixture of primary flash light and ambient light conditions, comprising:
  means for measuring light to produce a first output, with the influence of the preliminary flash light, and a second output, without the influence of the preliminary flash light, with respect to a plurality of selected areas of the object field, respectively including means for integrating the light measuring output during a given period of time including the duration of the preliminary flash light emission to produce the first output and means for obtaining a signal including an information of ambient light intensity excluding the preliminary flash light emission to produce the second output;
  a first group of means for storing the first output with respect to the plurality of areas, respectively;
  a second group of means for storing the second output with respect to the plurality of areas, respectively;
  means for manually setting the exposure time;
  means for calculating exposure information with respect to the plurality of areas from the stored first and second outputs for the corresponding areas and the exposure time set by the setting means, and
  means, responsive to the calculating means, for indicating the exposure information, including means for displaying the exposure information as locations on a visible scale, whereby the differences between the exposure information for the plurality of areas are perceptible as the distances between the locations on the scale with their order of alignment along the scale.

2. A light measuring device according to claim 1, wherein the calculating means includes means for repeating the calculation during a change in the set exposure time through the setting means with the storage of the first and second groups of storing means being maintained, to facilitate the perception of the changes in distances and order of alignment of the locations on the scale for the change in the exposure time to seek a suitable exposure time for a desired contrast of the object field.

3. A light measuring device according to claim 1 further comprising means for giving a fixed period of time and means for controlling the integrating time period of the integrating means in response to the giving means when the exposure time set by the setting means is longer than the fixed period of time, and in response to the setting means when the exposure time set by the setting means is shorter than the fixed period of time.

4. A light measuring device according to claim 1 further comprising means for setting a relation between the amount of preliminary flash light and that of primary flash light, wherein the measuring means includes first means for producing a light measuring information relating to the amount of the preliminary flash light as the first output and second means for producing a light measuring information relating to the intensity of the ambient light, and wherein the calculating means is further capable of responding to the relation setting means and repeating the calculation during a change in the relation through the relation setting means with the storage of the first and second groups of storing means maintained, to facilitate the perception of the changes in distances and order of alignment of locations on the scale for the change in the amount of the primary flash light relative to that of the preliminary flash light to seek a suitable amount of primary flash light for desired contrast of the object field.

5. A light measuring device according to claim 1, wherein the measuring means includes first means for producing a light measuring information relating to the amount of the preliminary flash light as the first output and second means for producing a light measuring information relating to the intensity of the ambient light as the second output, and wherein the light measuring device further comprises means, responsive to the first and second groups of storing means and the exposure time setting means, for controlling the indicating means to separately display the flash light amount, ambient light amount to be exposed during the exposure time and the sum thereof, respectively, as locations on the visible scale with respect to one of the plurality of areas, and means for selecting between a first display mode in which the indicating means is responsive to the calculating means and a second display mode in which the indicating means is responsive to the controlling means in place of the calculating means.

6. A light measuring device according to claim 1 further comprising means for setting the film speed, wherein the calculating means is further responsive to the film speed setting means to calculate aperture values as the exposure informations, and the visible scale is of aperture value.

7. A light measuring device according to claim 1, wherein the calculating means includes means for controlling the display so that the exposure information are displayed on a relative scale with one of the information selected as a standard.

8. A light measuring device for use in flash photography and capable of measuring both preliminary flash light and ambient light to obtain camera exposure information under a mixture of primary flash light and ambient light conditions, comprising:
  means for measuring light to produce a first output, with the influence of the preliminary flash light, and a second output, without the influence of the preliminary flash light, with respect to a plurality of selected areas of the object field, respectively;
  a first group of means for storing the first output with respect to theplurality of areas, respectively;
  a second group of means for storing the second output with respect to the plurality of areas, respectively;
  means for manually setting the exposure time;
  means for calculating exposure information with respect to the plurality of areas from the stored first and second outputs for the corresponding areas and the exposure time set by the setting means;
  means, responsive to the calculating means, for indicating the exposure information, including means for displaying the exposure information as locations on a visible scale, whereby the differences between the exposure information for the plurality of areas are perceptible as the distances between the locations on the scale along with their order of alignment, and
  means for setting the film speed, wherein the calculating means is further responsive to the film speed setting means to calculate aperture values as the exposure information, and the visible scale includes aperture value.

9. A light measuring device according to claim 8 further comprising means for selecting between a first display mode in which the exposure information are relatively displayed on a relative scale with selected one of the exposure informations located at a predetermined position on the scale as a standard without the participation of the film speed in the calculation and a second display mode in which the aperture values are displayed on the aperture value scale with the participation of the film speed in the calculation.

10. A light measuring device according to claim 9, wherein the displaying means includes a plurality of dots arranged along the direction of the scale to be visullay selected in response to the calculating means in both the first and second display modes for indicating the locations.

11. A light mesuring device according to claim 10, wherein the change in location of the selected dot on the scale for the change in the exposure information by 1 Ev is greater in the first display mode than in the second display mode.

12. Light measuring device for use in flash photography, which measures preliminary flash light and ambient light to obtain camera exposure information under a mixture of primary flash light and ambient light, comprising:
  means for measuring light including first means for producing a first light measuring information relating to the amount of preliminary flash light and second means for producing a second light measuring information relating to the intensity of ambient light;
  first means for storing the first light measuring information;
  second means for storing the second light measuring information;
  means for manually setting the exposure time;
  means for indicating the exposure information, including means for displaying the exposure information as locations on a visible scale, whereby the difference between the exposure information is perceptible as distances between the locations on the scale at a glance with their order of alignment along the scale; and
  means, responsive to the first and second storing means and the exposure time setting means, for controlling the indicating means to separately display the flash light amount and ambient light amount to be exposed during the exposure time, respectively, as the exposure information.

13. Light measuring device according to claim 12, wherein the controlling means is further capable of displaying the sum of the flash light amount and the ambient light amount to be exposed during the exposure time.

14. Light measuring device according to claim 13, wherein the indicating means includes means for differentiate the display of one of the exposure informations from another.

15. Light measuring device according to claim 13 further comprising means for setting a relation between the amount of preliminary flash light and that of primary flash light, wherein the controlling means is further responsive to the relation setting means.

16. A light measuring device according to claim 12, further comprising means for setting the film speed, wherein the controlling means is further responsive to the film speed setting means.

17. A light measuring device according to claim 13, further comprising means for setting the film speed, wherein the controlling means is further responsive to the film speed setting means.

18. A light measuring device according to claim 12, wherein the indicating means includes means to differentiate the display of one of the exposure information from another.

19. Light measuring device for use in flash photography, which measures preliminary flash light and ambient light to obtain camera exposure information under a mixture of primary flash light and ambient light, comprising:
- means for measuring light including first means for producing a first light measuring information relating to the amount of preliminary flash light and second means for producing a second light measuring information relating to the intensity of ambient light;
- first means for storing the first light measuring information;
- second means for storing the second light measuring information;
- means for manually setting the exposure time;
- means for indicating the exposure information, including means for displaying the exposure information as locations on a visible scale, whereby the difference between the exposure information is perceptible as distance between the locations on the scale at a glance with their order of alignment along the scale; and
- means, responsive to the first and second storing means and the exposure time setting means, for controlling the indicating means to separately display the amount and the sum of the flash light amount and ambient light amount to be exposure during the exposure time, respectively, as the exposure information.

20. A light measuring device according to claim 19, further comprising means for setting the film speed, wherein the controlling means is further responsive to the film speed setting means.

21. A light measuring device according to claim 19, wherein the indicating means includes means to differentiate the display of one of the exposure information from another.

22. A light measuring device for use in flash photography, which measures preliminary flash light and ambient light to obtain camera exposure information under a mixture of primary flash light and ambient light, comprising:
- means for measuring light to produce a first output with the influence of the preliminary flash light and a second output without the influence of the preliminary flash light;
- first means for storing the first output;
- second means for storing the second output;
- means for manually setting the exposure time;
- means for setting the film speed;
- means for indicating the exposure information, including means for displaying the exposure information as locations on a visible scale, whereby the difference between the individual exposure information is perceptible as distance between the locations on the scale along with their order of alignment along the scale;
- means, responsive to the first and second storing means, the exposure time setting means and the film speed setting means, for controlling the indicating means to separately display a plurality of aperture values representative of the share of the flash light amount in the exposure, as the exposure information, and
- means for selecting between a first display mode in which the exposure information is displayed on a relative scale with a selected one of the exposure information being located at a predetermined position on the scale as a standard without the participation of the film speed in the control of the indicating means and a second display mode in which the aperture values are displayed on an aperture value scale with the participation of the film speed in the control of the indicating means.

23. A light measuring device according to claim 22, wherein the displaying means includes a plurality of dots arranged along the direction of the scale to be visibly selected in response to the controlling means in both the first and second displaying modes for indicating the locations.

24. A light measuring device according to claim 23, wherein the change in location of the selected dot on the scale for the change in the exposure information by 1 Ev is greater in the first display mode than in the second display mode.

25. A light measuring device according to claim 22, wherein the controlling means is capable of controlling the indicating means to separately display the aperture value for the ambient light amount to be exposed during the exposure time and the aperture value for the sum of the flash light amount and the ambient light amount to be exposed during the exposure time, respectively.

26. Light measuring device for use in flash photography, which measures preliminary flash light and ambient light to obtain camera exposure information under a mixture of primary flash light and ambient light, comprising:
- means for measuring light including means for integrating light measuring output during a given period of time including the duration of the preliminary flash light emission to produce a first output and means for obtaining a signal including an information of ambient light intensity off the preliminary flash light emission to produce a second output;
- first means for storing the first output;
- second means for storing the second output;
- means for manually setting the exposure time;
- means for calculating exposure information in response to the storage of the first and second outputs in the first and second storing means and the exposure time set by the setting means;
- means, responsive to the calculating means, for indicating the exposure information;
- means for giving a fixed period of time; and
- means for controlling the integrating time period of the integrating means in response to the giving means when the exposure time set by the setting mean is longer than the fixed period of time, and in response to the setting means when the exposure time set by the setting means is shorter than the fixed period of time.

27. An exposure information indicating device for use in a light measuring device to provide exposure information for photography, comprising:
- means for displaying the exposure information as locations on a visible scale, whereby the difference between the exposure information is perceptible as distance between the locations on the scale with their order of alignment along the scale; and means for selecting between a first display mode in which the exposure information is relatively displayed with a selected one of the exposure information located at a predetermined position on the scale as a standard regardless of its absolute value and a second display mode in which the exposure information is absolutely displayed on the scale at variable positions depending on the absolute values for the exposure information, respectively.

28. Exposure information indicating device for use in light measuring device comprising;

a plurality of display dots arranged along a direction to be visually elected for indicating the exposure information as a location along the direction;

means for selecting between a first display mode and a second display mode, wherein the change in location of the selected dot along the direction per change in the exposure information by 1 Ev is greater in the first display mode than in the second display mode; and a first and a second scales for reading the location of the selected dot, the first scale being for use in the first display mode and having a graduation with a greater width for 1 Ev than that of the second scale which is for use in the second display mode.

29. A light measuring device for use in flash photography and capable of measuring both preliminary flash light and ambient light to obtain camera exposure information under a mixture of primary flash light and ambient light conditions, comprising:

means for measuring light to produce a first output, with the influence of the preliminary flash light, and a second output, without the influence of the preliminary flash light, with respect to a plurality of selected areas of the object field, respectively including a single light measuring element with a relatively small angle of acceptance;

a first group of means for storing a first output signal with respect to the plurality of areas, respectively;

a second group of means for storing a second output signal with respect to the plurality of areas, respectively;

means for actuating the production of the first and second output signals in response to an manual operation to send the first and second output signals to a predetermined one of the first group of storing means and to a corresponding one of the second group of storing means, respectively, whereby the production of the first and second output signals with respect to the plurality of selected areas and the storage thereof by the first and second groups are facilitated by sequentially aiming the angle of acceptance to the plurality of areas and repeating the manual operation of the actuating means corresponding thereto;

means for manually setting the exposure time;

means for calculating exposure information with respect to the plurality of areas from the stored first and second output signals for the corresponding areas and the exposure time set by the setting means, and means, responsive to the calculating means, for indicating the exposure information, including means for displaying the exposure information as locations on a visible scale, whereby the differences between the exposure information for the plurality of areas are perceptible as the distances between the locations on the scale with their order of alignment along the scale.

30. A light measuring device for use in flash photography and capable of measuring both preliminary flash light and ambient light to obtain camera exposure information under a mixture of primary flash light and ambient light conditions, comprising:

means for measuring light to produce a first output, with the influence of the preliminary flash light, and a second output, without the influence of the prelimianary flash light, with respect to a plurality of selected areas of the object field, respectively;

means for setting a relationship between the amount of preliminary flash light and that of the primary flash light that is desired, wherein the measuring means includes first means for producing light measuring information relating to the amount of the preliminary flash light as the first output and second means for producing light measuring information relating to the intensity of the ambient light;

a first group of means for storing the first output with respect to the plurality of areas, respectively;

a second group of means for storing the second output with respect to the plurality of areas, respectively;

means for manually setting the exposure time;

means for calculating exposure information with respect to the plurality of areas from the stored first and second outputs for the corresponding areas and the exposure time set by the setting means, and means, responsive to the calculating means for indicating the exposure information, including means for displaying the exposure information as locations on a visible scale, whereby the differences between the exposure information for the plurality of areas are perceptible as the distances between the locations on the scale with their order of alignment along the scale and wherein the calculating means is further capable of responding to the relationship setting means and repeating the calculation during a change in the relation through the relationship setting means with the storge contents of the first and second groups of storing means being maintained, to facilitate the perception of the changes in distances and order of alignment of locations on the scale for the change in the amount of the primary flash light relative to that of the preliminary flash light to seek a suitable amount of primary flash light for desired contrast of the object field.

31. A light measuring device for use in flash photography and capable of measuring both preliminary flash light and ambient light to obtain camera exposure information under a mixture of primary flash light and ambient light conditions, comprising:

means for measuring light to produce a first output, relating to the amount of the preliminary flash light, and a second output, relating to the intensity of the ambient light, with respect to a plurality of selected areas of the object field, respectively;

a first group of means for storing the first output with respect to the plurality of areas, respectively;

a second group of means for storing the second output with respect to the plurality of areas, respectively;

means for manually setting the exposure time;

means for calculating exposure information with respect to the plurality of areas from the stored first and second outputs for the corresponding areas and the exposure time set by the setting means; indicating means, responsive to the calculating means, for indicating the exposure information, including means for displaying the exposure information as locations on a visible scale, whereby the differences between the exposure information for the plurality of areas are perceptible as the distances between the locations on the scale with their order of alignment along the scale;

controlling means, responsive to the first and second groups of storing means and the exposure time setting means, for controlling the indicating means to separately display the flash light amount, ambient light amount to be exposed during the exposure time and the sum therof, respectively, as locations on the visible scale with respect to one of the plurality of areas, and means for selecting between a first display mode in which the indicating means is responsive to the calculation means and a second display mode in which the indicating means is responsive to the controlling means in place of the calculating means.

32. A light measuring device for use in flash photography and capable of measuring both preliminary flash light and ambient light to obtain camera exposure information under a mixture of primary flash light and ambient light conditions, comprising:

means for measuring light to produce a first output, with the influence of the preliminary flash light, and a second output, without the influence of the preliminary flash light, with respect to a plurality of selected areas of the object field, respectively;

a first group of means for storing the first output with respect to the plurality of areas, respectively;

a second group of means for storing the second output with respect to the plurality of areas, respectively;

means for manually setting the exposure time;

means for calculating exposure information with respect to the plurality of areas from the stored first and second outputs for the corresponding areas and the exposure time set by the setting means;

means, responsive to the calculating means, for indicating the exposure information, including means for displaying the exposure information as locations on a visible scale, whereby the differences between the exposure information for the plurality of areas are perceptible as the distance betwwen the locations on the scale along with their order of alignment, and means for controlling the displaying means so that the exposure information is relatively displayed on a relative scale with one of the possible exposure information selected as a standard.

33. A light measuring device for use in flash photography, which measures preliminary flash light and ambient light to obtain camera exposure information under a mixture of primary flash light and ambient light, comprising:

means for measuring light to produce a first output with the influence of the preliminary flash light and a second output without the influence of the preliminary flash light;

first means for storing the first output;
second means for storing the second output;
means for manually setting the exposure time;
means for setting the film speed;

means for indicating the exposure information, including means for displaying the exposure information as locations on a visible scale, whereby the difference between the individual exposure information is perceptible as distance between the locations on the scale along with their order of alignment along the scale;

means, responsive to the first and second storing means, the exposure time setting means and the film speed setting means, for controlling the indicating means to separately display a plurality of aperture values representative of the share of flash light amount in the exposure, as the exposure information wherein the controlling means is capable of controlling the indicating means to separately display the aperture value for the ambient light amount to be exposed during the exposure time and the aperture value for the sum of the flash light amount and the ambient light amount to be exposed during the exposure time, respectively.

34. An exposure information indication device for use in a light measuring device to provide exposure information for photography, comprising:

means for displaying the exposure information as locations on a visible scale, whereby the difference between the exposure information is perceptible as distance between the locations on the scale along with their order of alignment along the scale, the displaying means including a plurality of dots arranged along the direction of the scale to be visually selected for indicating the locations, and means for selecting between a first display mode and a second display mode, wherein the change in location of the selected dot on the scale for change in the exposure information by 1 Ev is greater in the first display mode than in the second display mode wherein the displaying means further includes a first and a second scale for reading the location of the selected dot, the first scale being for use in the first display mode and having a graduation with a greater width for 1 Ev than that of the second scale which is for use in the second display mode.

35. An exposure information indicationg device for use in a light measuring device to provide exposure information for photography, comprising:

means for displaying the exposure information as locations on a visible scale, whereby the difference between the exposure information is perceptible as distance between the locations on the scale at a glance with their order of alignment along the scale, the displaying means including a plurality of dots arranged along the direction of the scale to be visually selected for indication the locations; and means for selecting between a first display mode and a second display mode, wherein the change in location of the selected dot on the scale for change in the exposure information by 1 Ev is greater in the first display mode than in-the second display mode.

* * * * *